US011915343B2

(12) United States Patent
Maheshwari et al.

(10) Patent No.: US 11,915,343 B2
(45) Date of Patent: Feb. 27, 2024

(54) COLOR REPRESENTATIONS FOR TEXTUAL PHRASES

(71) Applicant: ADOBE INC., San Jose, CA (US)

(72) Inventors: Paridhi Maheshwari, Bhopal (IN); Vishwa Vinay, Bangalore (IN); Dhananjay Raut, Maharashtra (IN); Nihal Jain, Mumbai (IN); Praneetha Vaddamanu, Hyderabad (IN); Shraiysh Vaishay, Jhansi (IN)

(73) Assignee: ADOBE INC., San Jose, CA (US)

( * ) Notice: Subject to any disclaimer, the term of this patent is extended or adjusted under 35 U.S.C. 154(b) by 310 days.

(21) Appl. No.: 17/111,819

(22) Filed: Dec. 4, 2020

(65) Prior Publication Data

US 2022/0180572 A1    Jun. 9, 2022

(51) Int. Cl.

| | |
|---|---|
| *G06T 11/00* | (2006.01) |
| *G06F 40/253* | (2020.01) |
| *G06F 40/30* | (2020.01) |
| *G06V 10/56* | (2022.01) |
| *G06F 18/24* | (2023.01) |
| *G06F 18/214* | (2023.01) |
| *G06N 3/08* | (2023.01) |
| *G06N 3/044* | (2023.01) |

(52) U.S. Cl.
CPC .......... *G06T 11/001* (2013.01); *G06F 18/214* (2023.01); *G06F 18/24* (2023.01); *G06F 40/253* (2020.01); *G06F 40/30* (2020.01); *G06N 3/044* (2023.01); *G06N 3/08* (2013.01); *G06V 10/56* (2022.01)

(58) Field of Classification Search
CPC ...... G06T 11/001; G06F 40/253; G06F 10/30; G06F 18/24; G06F 18/214; G06V 10/56
See application file for complete search history.

(56) References Cited

U.S. PATENT DOCUMENTS

| | | | |
|---|---|---|---|
| 5,304,786 A * | 4/1994 | Pavlidis ............. | G06K 17/0016 235/462.07 |
| 10,395,108 B1 * | 8/2019 | Geng ............... | G06V 30/19173 |
| 11,210,624 B1 * | 12/2021 | Wang .................... | G06N 3/084 |
| 11,704,685 B2 * | 7/2023 | Najmi ............... | G06Q 10/0637 705/7.33 |

(Continued)

OTHER PUBLICATIONS

Vedaldi, et al., "Efficient Additive Kernels Via Explicit Feature Maps", IEEE transactions on pattern analysis and machine intelligence, 34.3, (2012), pp. 480-492.

(Continued)

*Primary Examiner* — Kevin Ky
(74) *Attorney, Agent, or Firm* — F. CHAU & ASSOCIATES, LLC

(57) ABSTRACT

Systems and methods for color representation are described. Embodiments of the inventive concept are configured to receive an attribute-object pair including a first term comprising an attribute label and a second term comprising an object label, encode the attribute-object pair to produce encoded features using a neural network that orders the first term and the second term based on the attribute label and the object label, and generate a color profile for the attribute-object pair based on the encoded features, wherein the color profile is based on a compositional relationship between the first term and the second term.

20 Claims, 17 Drawing Sheets

(56) References Cited

U.S. PATENT DOCUMENTS

| | | | | |
|---|---|---|---|---|
| 2005/0011959 | A1* | 1/2005 | Grosvenor | H04N 7/18 |
| | | | | 707/E17.023 |
| 2013/0208304 | A1* | 8/2013 | Hoover | G03G 15/0435 |
| | | | | 358/1.15 |
| 2015/0123987 | A1* | 5/2015 | Hong | G06F 3/14 |
| | | | | 345/593 |
| 2015/0297949 | A1* | 10/2015 | Aman | G06T 7/246 |
| | | | | 348/157 |
| 2018/0197052 | A1* | 7/2018 | Yanson | G06K 19/06037 |
| 2019/0354806 | A1* | 11/2019 | Chhabra | G06N 3/044 |
| 2021/0279417 | A1* | 9/2021 | Delaney | G06F 40/30 |
| 2022/0180572 | A1* | 6/2022 | Maheshwari | G06N 3/045 |

OTHER PUBLICATIONS

Plummer, et al., "Flickr30k Entities: Collecting Region-to-Phrase Correspondences for Richer Image-to-Sentence Models", Proceedings of the IEEE international conference on computer vision, 2015, 9 pages.

Jetley, et al., "Learn to Pay Attention", International Conference on Learning Representations, 2018, 14 pages.

Berlin, Brent, and Paul Kay, "Basic color terms: Their universality and evolution", Univ of California Press, 1991; Found on the internet: https://www.google.com/books/edition/Basic_Color_Terms/sGDxruwl9OkC?hl=en&gbpv=0.

Brysbaert, et al., "Concreteness ratings for 40 thousand generally known English word lemmas" 2014, 27 pages.

Geikhman, "The Essentials of English Adjectives: 7 Key Adjective Types to Know", 2020; Found on the internet: https://www.fluentu.com/blog/english/english-adjectives/.

Wei, et al., "Adversarial Fine-Grained Composition Learning for Unseen Attribute-Object Recognition", Proceedings of the IEEE International Conference on Computer Vision, 2019, 9 pages.

Wang, et al., "Task-Aware Feature Generation for Zero-Shot Compositional Learning", arXiv preprint arXiv:1906.04854, (2019), 17 pages.

Color Your Spring with Adobe Color Gradients; Found on the internet: https://theblog.adobe.com/color-your-spring-with-adobe-color-gradients/.

He, et al., "Deep Residual Learning for Image Recognition", 2016 IEEE Conference on Computer Vision and Pattern Recognition (CVPR), (2016), 9 pages.

Pennington, et al., "Glove: Global Vectors for Word Representation", The 2014 conference on empirical methods in natural language processing (EMNLP), 2014, pp. 1532-1543.

Burges, et al., "Learning to Rank using Gradient Descent", Proceedings of the 22nd international conference on Machine learning, 2005, 8 pages.

Pantone Color Institute; Found on the internet: https://www.pantone.com/color-consulting/about-pantone-color-institute.

Adobe Color: https://color.adobe.com/explore.

Colourlovers; Found on the internet: https://www.colourlovers.com/colors.

Picular; Found on the internet: https://picular.co/.

Li, et al., "Symmetry and Group in Attribute-Object Compositions", Proceedings of the IEEE/CVF Conference on Computer Vision and Pattern Recognition, 2020, pp. 11316-11325.

Misra, et al., "From Red Wine to Red Tomato: Composition with Context", Proceedings of the IEEE Conference on Computer Vision and Pattern Recognition., 2017, pp. 1792-1801.

Maheshwari, et al., "Learning Colour Representations of Search Queries", The 43rd International ACM SIGIR Conference on Research and Development in Information Retrieval, 2020, 10 pages.

Nagarajan, et al. "Attributes as Operators: Factorizing Unseen Attribute-Object Compositions", Proceedings of the European Conference on Computer Vision (ECCV), 2018, 17 pages.

Russakovsky, et al., "Imagenet Large Scale Visual Recognition Challenge", International journal of computer vision (2015), 43 pages.

Michel, et al., "Quantitative Analysis of Culture Using Millions of Digitized Books", 2011, 7 pages.

Vedaldi, et al., "Efficient Additive Kernels Via Explicit Feature Maps", IEEE transactions on pattern analysis and machine intelligence, 34.3, pp. 480-492, Jan. 2012.

Plummer, et al., "Flickr30k Entities: Collecting Region-to-Phrase Correspondences for Richer Image-to-Sentence Models", Proceedings of the IEEE international conference on computer vision, 9 pages, Dec. 2015.

Jetley, et al., "Learn to Pay Attention", International Conference on Learning Representations, 4 pages, Apr. 2018.

Berlin, Brent, and Paul Kay, "Basic color terms: Their universality and evolution", Univ of California Press, 1991 (no month info available); Found on the internet: https://www.google.com/books/edition/Basic_Color_Terms/sGDxruwl9OkC?hl=en&gbpv=0.

Brysbaert, et al., "Concreteness ratings for 40 thousand generally known English word lemmas", 27 pages, Sep. 2014.

Geikhman, "The Essentials of English Adjectives: 7 Key Adjective Types to Know", 2020 (no month info available); Found on the internet: https://www.fluentu.com/blog/english/english-adjectives/.

Wei, et al., "Adversarial Fine-Grained Composition Learning for Unseen Attribute-Object Recognition", Proceedings of the IEEE International Conference on Computer Vision, Oct. 2019, 9 pages.

Wang, et al., "Task-Aware Feature Generation for Zero-Shot Compositional Learning", arXiv preprint arXiv:1906.04854, 7 pages, Mar. 2020.

Color Your Spring with Adobe Color Gradients; Apr. 2020; Found on the internet: https://theblog.adobe.com/color-your-spring-with-adobe-color-gradients/.

He, et al., "Deep Residual Learning for Image Recognition", 2016 IEEE Conference on Computer Vision and Pattern Recognition (CVPR), Jun. 2016, 9 pages.

Pennington, et al., "Glove: Global Vectors for Word Representation", The 2014 conference on empirical methods in natural language processing (EMNLP), Oct. 2014, pp. 1532-1543.

Burges, et al., "Learning to Rank using Gradient Descent", Proceedings of the 22nd international conference on Machine learning, Aug. 2005, 8 pages.

Pantone Color Institute; Nov. 2020; Found on the internet: https://www.pantone.com/color-consulting/about- pantone-color-institute.

Adobe Color: https://color.adobe.com/explore; Nov. 2020.

Colourlovers; Found on the internet: https://www.colourlovers.com/colors; Nov. 2020.

Picular; Found on the internet: https://picular.co/; Nov. 2020.

Li, et al., "Symmetry and Group in Attribute-Object Compositions", Proceedings of the IEEE/CVF Conference on Computer Vision and Pattern Recognition, Jun. 2020, pp. 11316-11325.

Misra, et al., "From Red Wine to Red Tomato: Composition with Context", Proceedings of the IEEE Conference on Computer Vision and Pattern Recognition., Jul. 2017, pp. 1792-1801.

Maheshwari, et al., "Learning Colour Representations of Search Queries", The 43rd International ACM SIGIR Conference on Research and Development in Information Retrieval, Jul. 2020, 10 pages.

Nagarajan, et al. "Attributes as Operators: Factorizing Unseen Attribute-Object Compositions", Proceedings of the European Conference on Computer Vision (ECCV), Sep. 2018, 17 pages.

Russakovsky, et al., "Imagenet Large Scale Visual Recognition Challenge", International journal of computer vision (Jan. 2015), 43 pages.

Michel, et al., "Quantitative Analysis of Culture Using Millions of Digitized Books", Jan. 2011, 7 pages.

\* cited by examiner

COLOR REPRESENTATIONS FOR TEXTUAL PHRASES

BACKGROUND

The following relates generally to color representation, and more specifically to color representation using machine learning.

Attributes such as color may play a role in image classification. For example, color is an important factor in some content-based image retrieval (CBIR) systems. Using a CIBR system, users search for images on an image search engine based on input queries. These input queries may include attributes that explicitly indicate color or that imply a color intent. The relevancy of the retrieved images depends on an appropriate understanding of these attributes.

For example, the impact of the attribute "ripe" on color is different for coffee and oranges. A ripe orange may differ from an unripe orange in that it has a more orange color, whereas ripe coffee berries may have a red color. Furthermore, when people use the term "ripe" with coffee it may change the relevant search results from depicting beans to berries.

Conventional image retrieval systems may incorporate color information into the search results, but they do not take into account the complex interrelationships between different attribute/object pairs. Therefore, there is a need in the art for an improved color representation apparatus that can generate rich, accurate, and meaningful color representations of unseen combinations of attribute-object phrases.

SUMMARY

The present disclosure describes systems and methods for performing color representation. Embodiments of the disclosure provide a color representation apparatus. The color representation apparatus includes a neural network that learns a color representation and predicts a color profile for an attribute-object pair. Embodiments of the neural network are trained using a multi-task loss function.

A method, apparatus, and non-transitory computer readable medium for color representation are described. Embodiments of the method, apparatus, and non-transitory computer readable medium are configured to receive an attribute-object pair including a first term comprising an attribute label and a second term comprising an object label, encode the attribute-object pair to produce encoded features using a neural network that orders the first term and the second term based on the attribute label and the object label, and generate a color profile for the attribute-object pair based on the encoded features, wherein the color profile is based on a compositional relationship between the first term and the second term.

An apparatus and method for learning color representation comprising a neural network are described. Embodiments of the apparatus and method include an encoder configured to encode an attribute-object pair to produce encoded features based on an ordering of a first term comprising an attribute label and a second term comprising an object label and a decoder configured to generate a color profile for the attribute-object pair based on the encoded features, wherein the color profile is based on a compositional relationship between the first term and the second term.

A method, apparatus, and non-transitory computer readable medium of training a neural network for color representation are described. Embodiments of the method, apparatus, and non-transitory computer readable medium are configured to identify a training set including attribute-object pairs and a ground truth color profile for each of the attribute-object pairs, predict a color profile for each of the attribute-object pairs using a neural network that orders a first term and a second term of the attribute-object pairs based on an attribute label and an object label, compare the predicted color profile for each of the attribute-object pairs to the corresponding ground truth color profile using a multi-task loss function, and update parameters of the neural network based on the comparison.

DETAILED DESCRIPTION

Figure 1:
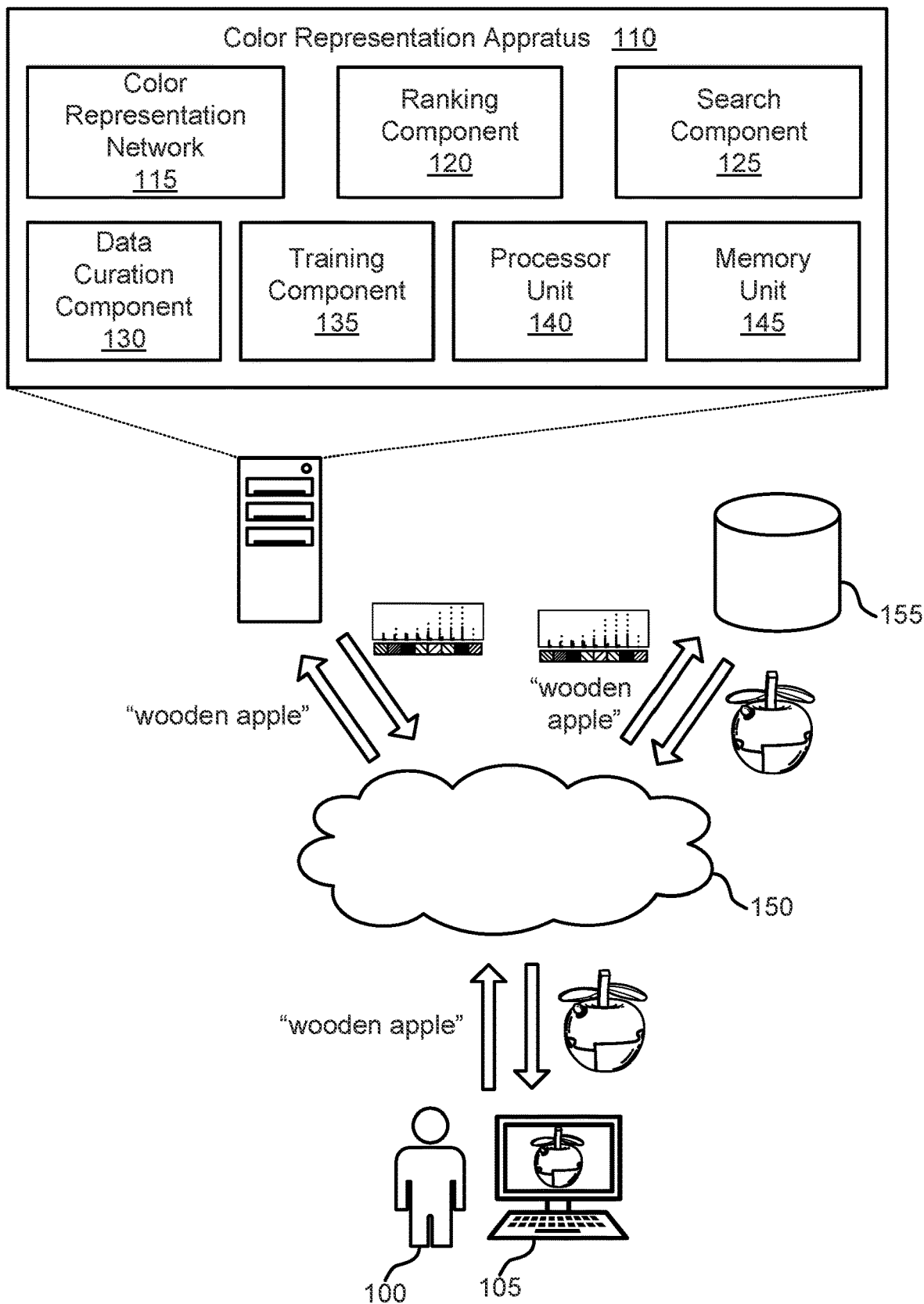
FIG. 1 shows an example of a system for color representation according to aspects of the present disclosure.

The present disclosure describes systems and methods for performing color representation. Embodiments of the disclosure provide a neural network color representation apparatus that learns color representations and predicts a color profile for a text query (e.g., a text phrase including an attribute-object pair).

Color representation of text may be used in applications such as searching for images based on a text query. However, conventional color representation systems identify colors based on the meaning of individual words, and do not take into account the impact of the composition of different words together. Therefore, these systems are not able to generate rich and accurate color representations. Additionally, conventional systems are generally limited to a predetermined catalog of colors.

By contrast, embodiments of the present disclosure include improved color representation systems that exploit composition and context to extend information learned from known visual concepts, generalize this knowledge about unseen colors and concepts. For example, having learned about the objects "snake" and "elephant" and the concept "small snake", the models can learn the visual characteristics of the unknown concept "small elephant".

An improved color representation apparatus described in the present disclosure can generate richer and more accurate color representations based on an improved understanding of the text queries. Embodiments of the present disclosure provide network models that compose textual phrases and generate improved color representations. In addition, some embodiments of the present disclosure consider a wide vocabulary for both entities of an attribute-object pair, and achieve efficiency by focusing on the visual representation of color. As a result, embodiments of the present disclosure produce rich color profiles that can be used to provide more relevant image search results compared to conventional systems.

According to an embodiment, the improved color representation apparatus includes an attention mechanism to remove noise from images to obtain better ground truth color profiles to train text-to-color models. The improved color representation apparatus implements various machine learning (ML) models based on the principal of composition and taking into the account the linguistic properties of phrases. Furthermore, various distance functions are used to train the text-to-color models. The text-to-color models are integrated into a pipeline for ranking images. Thus, given textual queries and a large collection of images, the improved color representation apparatus returns an ordering within the images through color features derived from text in addition to using other standard textual features.

For an (attribute, object) textual phrase, the improved color representation apparatus focuses on an area in the image localized around where the corresponding object is present. The ground-truth color profiles obtained from this region provides a better indicator of its color intent than the whole image. According to an embodiment, a network model is configured to provide text-to-color-embedding translation.

For the specific class of textual phrases that fit the (attribute, object) pattern, one embodiment includes a dataset curation mechanism that can be generalized to any attribute class of choice. The embodiment targets on attributes that have varying degrees of impact on the axis of color.

According to one embodiment, a data driven pre-processing step on the image modality is provided. Based on the pre-processing step, a more robust visual signal is extracted and used as ground truth to train the text-to-color models. The improved color representation apparatus includes a text-modality model component and increases efficiency in the composition versus context spectrum.

The network models of the present disclosure increase in performance on tasks such as ranking and classification. In some embodiments, given an (attribute, object) pair, the network models can sort a set of images in order of relevance to the query for ranking tasks. For classification tasks, given an image, the network models can assign the image to the appropriate (attribute, object) class.

Example System Overview

FIG. 1 shows an example of a system for color representation according to aspects of the present disclosure. The example shown includes user 100, user device 105, color representation apparatus 110, cloud 150, and database 155. In one embodiment, color representation apparatus 110 includes color representation network 115, ranking component 120, search component 125, data curation component 130, training component 135, processor unit 140, and memory unit 145. However, in some embodiments, the components and functions of the color representation apparatus 110 are located on the user device 105.

The user 100 may communicate with the color representation apparatus 110 via the user device 105 and the cloud 150. The user may input a text query that includes an attribute and an object (i.e., attribute-object pair). In some examples, an attribute object pair consists of a first word that corresponds to an attribute that modifies a second word that corresponds to an object. In other examples, the first word is an object, and the second word is an attribute.

The text query is input to the color representation apparatus, which returns the predicted color profile for the text query. A color profile may refer to a representation of which colors are relevant to the text query or the attribute-object pair. For example, a color profile may include an ordered list of colors with a value associated with each color, and may be represented as a histogram. The user 100 may communicate with the database 155 via the user device 105 and the cloud 150. The predicted color profile is input to the database 155, which returns one or more images corresponding to the color profile.

The user device 105 may be a personal computer, laptop computer, mainframe computer, palmtop computer, personal assistant, mobile device, or any other suitable processing apparatus.

A processor unit 140 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 140 is configured to operate a memory array using a memory controller. In other cases, a memory controller is integrated into the processor unit 140. In some cases, the processor unit 140 is configured to execute computer-readable instructions stored in a memory to perform various functions. In some embodiments, a processor unit 140 includes special purpose components for modem processing, baseband processing, digital signal processing, or transmission processing.

Examples of a memory unit 145 include random access memory (RAM), read-only memory (ROM), or a hard disk. Examples of memory unit 145 include solid state memory and a hard disk drive. In some examples, memory unit 145 is used to store computer-readable, computer-executable software including instructions that, when executed, cause a processor to perform various functions described herein. In some cases, the memory unit 145 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 145 store information in the form of a logical state.

A database 155 is an organized collection of data. For example, a database 155 stores data in a specified format known as a schema. A database 155 may be structured as a single database, a distributed database, multiple distributed databases, or an emergency backup database. In some cases, a database controller may manage data storage and processing in a database 155. In some cases, a user interacts with database controller. In other cases, database controller may operate automatically without user interaction. In some examples, the database 155 includes a set of images, which may correspond to a color profile or a text query (e.g., a query including an attribute-object pair).

A cloud 150 is a computer network configured to provide on-demand availability of computer system resources, such as data storage and computing power. In some examples, the cloud 150 provides resources without active management by the user. The term cloud 150 is sometimes used to describe data centers available to many users over the Internet. Some large cloud networks have functions distributed over multiple locations from central servers. A server is designated an edge server if it has a direct or close connection to a user. In some cases, a cloud 150 is limited to a single organization. In other examples, the cloud 150 is available to many organizations. In one example, a cloud 150 includes a multi-layer communications network comprising multiple edge routers and core routers. In another example, a cloud 150 is based on a local collection of switches in a single physical location.

In some embodiments, the color representation apparatus 110 includes an artificial neural network (ANN) to increase the quality of a color profile, predict a color profile for an attribute-object pair, increase relevance for image search, etc. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A loss function may be used to determine how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are mode during the next iteration.

In some examples, an ANN may refer to a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

In some embodiments, the color representation apparatus 110 includes a convolutional neural network (CNN). For example, a color classifier including a set of convolution layers, one or more attention layers, and a classification layer, is used to identify an image color profile for images in an image set. A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, the color representation apparatus 110 receives an attribute-object pair including a first term including an attribute label and a second term including an object label. The color representation apparatus 110 predicts a color profile for each of the attribute-object pairs using a neural network that orders a first term and a second term of the attribute-object pairs based on an attribute label and an object label. According to an embodiment, the color representation apparatus 110 includes at least a data curation component, a color representation network (i.e., for predicting a color profile based on attribute/object labels), and an image retrieval and classification network (e.g., a ranking component). In some cases, the color representation network 115 is also referred to as a text-to-color network or a text-to-color model.

A common structure observed in search queries is of attribute-object pairs, such as "cute dog" or "yellow brick road". In some cases, an attribute from an attribute-object pair or a search query may include one or more words (e.g., carnation pink, yellow orange, violet red). In some other cases, an object of an attribute-object pair may include one or more words. To handle complex composite queries like "red bricks on a white background", it is important to understand the constituent blocks, i.e., "red bricks" and "white background". Embodiments of the present disclosure examine the role that attributes (or adjectives) play in complex queries and derive useful characteristics. In some cases, an attribute or an adjective can change the color profile of an object. For example, an object "coffee" has an impression of being brown. But "ripe coffee" is red. Here, the color profile of the same object is changed by adding the attribute "ripe". Furthermore, the word/attribute "ripe" on color is different for different objects (e.g., coffee and orange). For example, ripe coffee is red while ripe orange has orange or yellow color. According to an embodiment, the color representation apparatus 110 is configured to exploit composition and context to extend knowledge from known visual concepts to learn and generalize about unseen concepts. For example, having learned about the objects "snake" and "elephant" and the concept "small snake", the color representation apparatus 110 can learn the visual characteristics of the unknown concept "small elephant". In an embodiment, the color representation apparatus 110 composes complex concepts from simple primitive ones.

Color representation network 115 is an example of, or includes aspects of, the corresponding element described with reference to FIGS. 5, 6, and 16. According to an embodiment, the color representation network 115 generates a visual profile of (attribute, object) combinations using compositionality and context. The color representation network 115 models from text to a color representation. In some cases, the color representation network 115 is also referred to as a neural network, a text-to-color network or a text-to-color model. The color representation network 115 may vary in model components and training techniques.

According to an embodiment, the color representation network 115 includes an encoder and a decoder. The encoder is configured to encode an attribute-object pair to produce encoded features based on an ordering of a first term comprising an attribute label and a second term comprising an object label. Encoded features may refer to a vector of values output by the encoder that represents both the semantic meaning of individual terms and the composition of the terms, including interaction effects between the terms.

The decoder is configured to generate a color profile for the attribute-object pair based on the encoded features, where the color profile is based on a compositional relationship between the first term and the second term. A compositional relationship refers to information about how the individual terms in an attribute-object pair modify the meaning of other terms. For example, the meaning of the term "ripe" is different when composed with "orange" than it is when composed with "coffee".

Attributes (e.g., color) are used in a neural network for image classification or image retrieval. Embodiments of the present disclosure relate to the impact of attributes on color visual aspect. Color is one factor in content-based image retrieval (CBIR) systems. For example, the attribute "raw" alters the color profile for objects "lemon" and "coffee" differently. "Raw coffee" has an emerald or fern green color while raw lemon is lemon green. In addition to the generic attributes such as "old" and "fresh", there are multiple types of attributes or compositions specific to color, for example, color combinations such as "pink red" and "orange red", intensifiers such as "deep" and "dark", and common knowledge in daily life such as "blood red". In some examples, color combinations may include one or more words.

According to some embodiments, the color representation network 115 is configured to consider different linguistic components (adjective, noun, etc.) of textual phrases and use the concepts of composition and context to construct a text-to-color model and generalize to unseen (attribute, object) combinations.

According to some embodiments, ranking component 120 extracts image features and an image color profile from an image. In some examples, the ranking component 120 combines the color profile, an embedding of the first term and the second term, the image features, and the image color profile to produce a feature vector. The ranking component 120 generates a relevance score for the attribute-object pair and the image by decoding the feature vector.

According to some embodiments, ranking component 120 includes an image feature extractor, an image color profile component, a word embedding model, and a scoring component, where the ranking component 120 is configured to generate a relevance score for the attribute-object pair and an image.

According to an embodiment, the ranking component 120 includes an image retrieval and classification setup that is configured to use the learned color representations derived from text, in addition to textual and image features, and return an ordering of images (e.g., ranking) for a given textual query. In some examples, the textual query is "crimson velvet".

According to some embodiments, search component 125 searches for images based on the color profile. Embodiments of the present disclosure relate to a multi-modal setting where visual assets (e.g., images) are coupled with textual descriptions. One example of application is search (e.g., Google® images, Adobe® Stock, etc.) where users retrieve relevant images for a given user query. These user queries are often complex such that the richness and ambiguities of language make accurate retrieval of images a challenging task. In some embodiments, a color representation network 115 is configured to increase in the understanding of queries and their relevance to images such that the search component 125 can search for images more accurately and efficiently.

According to some embodiments, data curation component 130 identifies an initial set of images corresponding to an initial set of attribute-object pairs, where each of the images is associated with one of the attribute-object pairs. In some examples, data curation component 130 selects an initial subset of attributes. In some examples, data curation component 130 selects an initial subset of objects from the attribute-object pairs that include one of the initial subset of attributes. In some examples, data curation component 130 selects an additional subset of attributes from the attribute-object pairs that include one of the initial subset of objects. Some embodiments include curating customized datasets to capture textual phrases that have significant color implications.

In some examples, the data curation component 130 identifies a set of n-grams. The data curation component 130 filters the set of n-grams to produce a set of bigrams. The data curation component 130 filters the set of bigrams based on linguistic type to produce the attribute-object pairs. The data curation component 130 selects a set of images by searching for images associated with the attribute-object pairs.

In some examples, the data curation component 130 identifies a caption for each of the images. The data curation component 130 performs part-of-speech tagging on the caption for each of the images to produce the attribute-object pairs. In some examples, data curation component 130 identifies a threshold constraint of unique attributes per object or unique objects per attribute. The data curation component 130 filters the training set by removing unsuitable attribute-object pairs that do not meet the threshold constraint.

According to some embodiments, training component 135 identifies a training set including attribute-object pairs and a ground truth color profile for each of the attribute-object pairs. The training component 135 compares the predicted color profile for each of the attribute-object pairs to the corresponding ground truth color profile using a multi-task loss function. The training component 135 updates parameters of the neural network based on the comparison. In some examples, training component 135 generates the training set by selecting a subset of the set of images associated with an attribute-object pair that includes one of the initial subset of attributes or the additional subset of attributes. In some examples, training component 135 identifies an image associated with each of the attribute-object pairs. In some examples, the multi-task loss function includes a first term corresponding to an L2 task, a second term corresponding to a triplet loss task, and a third term corresponding to a quintuplet loss task.

According to an embodiment, the ground-truth color profiles are derived from images using the training component 135, and the training component 135 can extract less noisy ground-truth data, which can be used to train more effective network models. According to some embodiments, multiple loss functions are used to learn color representations compositionally from textual input.

Figure 2:
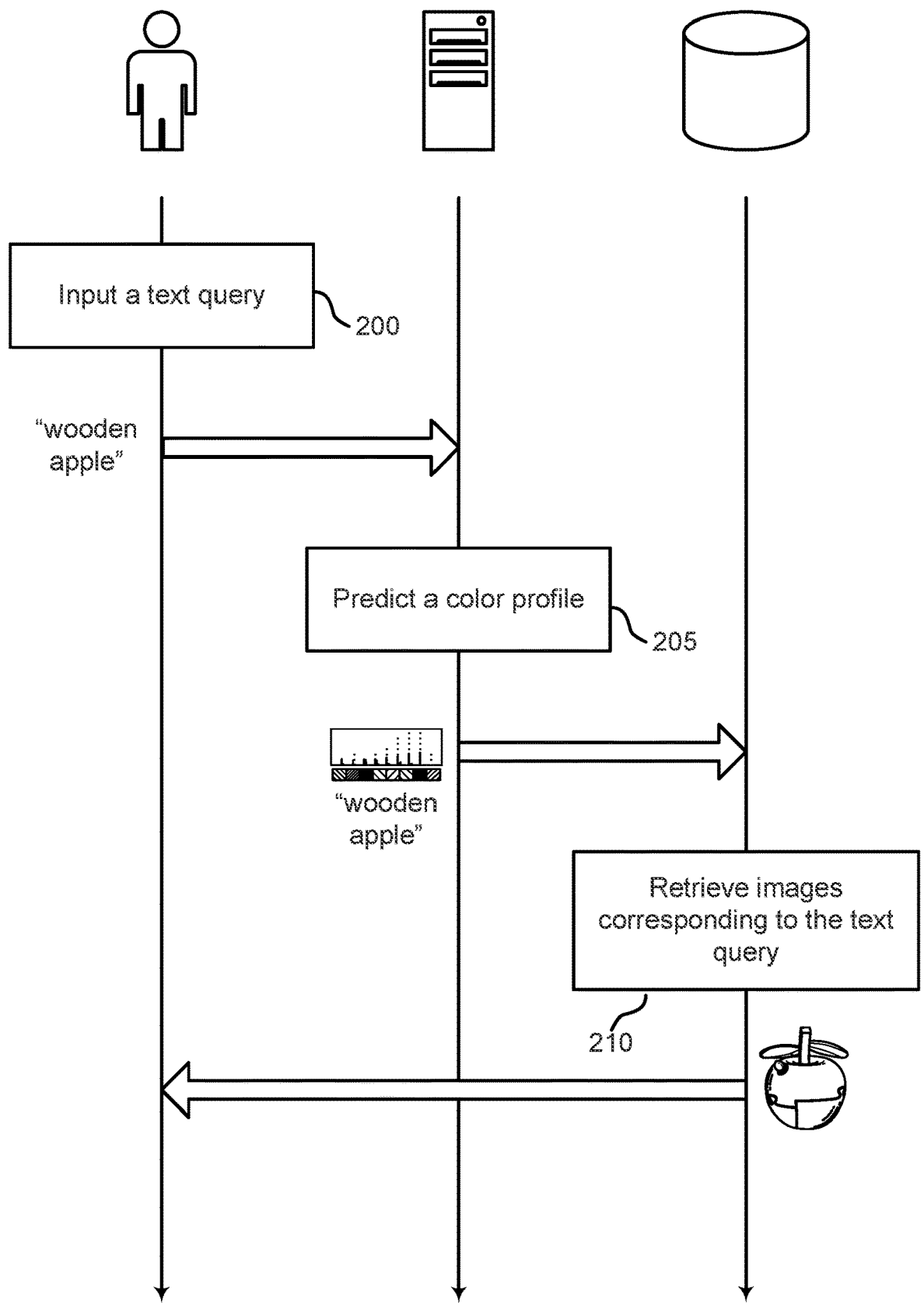
FIG. 2 shows an example of a process for color representation according to aspects of the present disclosure.

FIG. 2 shows an example of a process for color representation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user inputs a text query including an attribute-object pair. In some cases, the user inputs a text query on an image search engine. According to an example, the text query is "wooden apple". The attribute is "wooden", and the object is "apple". In most cases, apple is of color red. However, the attribute "wooden" has an impact on the color of the object (i.e., wooden apple is usually brown). In some cases, the operations of this step refer to, or may be performed by, a user as described with reference to FIG. 1.

At operation 205, the system predicts a color profile based on the attribute-object pair. In some cases, an attribute or adjective can change the color profile of an object. For example, an object "coffee" has an impression of being brown. But "ripe coffee" is red. Here, the color profile of the same object is changed by adding the attribute "ripe". Furthermore, the effect of attribute "ripe" on color is different for different objects (e.g., coffee and orange). For example, ripe coffee is red while ripe orange has orange or yellow color. In some cases, the operations of this step refer to, or may be performed by, a color representation network as described with reference to FIGS. 1, 5, 6, and 16.

According to some embodiments, the color representation network (see FIGS. 1, 5, and 6) generates color profiles (and in some cases, the system displays the top colors for easier visualization). The neural network captures context such that the attribute "wooden" has an impact on the color of the object, in this example, "wooden apple". While a regular apple is red, a wooden apple is brown.

In some examples, the neural network captures context such that the attribute "hot" has different effects when modifying different objects such as "hot sun" and "hot pepper". The neural network also learns the notion of composition, for example, "young leaves" are rich in green color while "fallen leaves" are represented well in the brown-to-red spectrum. Furthermore, the neural network can highlight multiple colors. For the query "bright sun", the neural network is able to learn that on a bright day a golden yellow sun is visible in a blue sky. The neural network learns meaningful color representations for unseen combinations of (attribute, object) pairs. For "old gold" and "crimson velvet", the generated color profiles reasonably capture the semantics of the queries.

At operation 210, the database or the system retrieves images corresponding to the text query based on the color profile. According to the example above, the system retrieves images that are related to the text query "wooden apple". The retrieved images are viewed by the user. The user may perform further action on the images or edit the input query to collect a different set of images from the database. According to an embodiment, the text query and the color profile are both used by the system to retrieve the images during an image search task. In some cases, the operations of this step refer to, or may be performed by, a database in conjunction with a search component as described with reference to FIG. 1.

Figure 3:
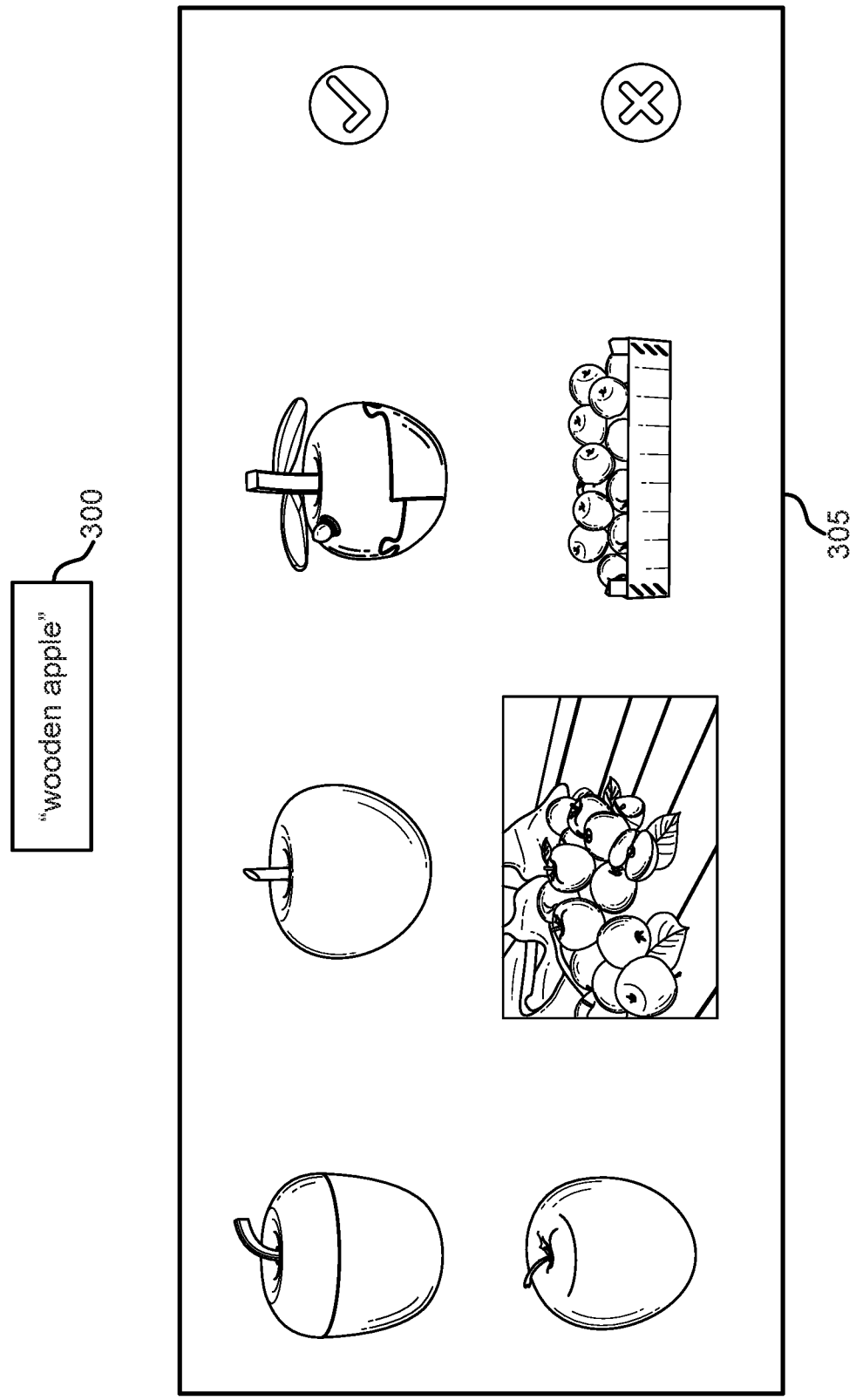
FIG. 3 shows an example of a search query including an attribute-object pair according to aspects of the present disclosure.

FIG. 3 shows an example of a search query 300 including an attribute-object pair according to aspects of the present disclosure. The example shown includes search query 300 and image result 305. According to an example, the search query 300 is "wooden apple". "Wooden apple" is an attribute-object pair, in which the attribute is "wooden", and the object is "apple". In some cases, the search query 300 comes from a user who searches for digital images using an image search engine (e.g., Google® image search).

There are multiple applications that provide access to a set of visual assets via a search functionality. Some examples include Adobe® Stock, Lightroom CC, Behance, and Adobe® Experience Manager (AEM) assets. It is natural for color to be a common query pattern in this setting. Different observed sub-classes of user-provided queries are relevant in the setting of the present disclosure. These search queries may span from the unitary (attribute, object) structure, for example "red rose", to more complicated clauses which can be subdivided as composites of such combinations, for example, "white house blue door". In addition to covering these query classes, embodiments of the present disclosure can process terms that are not strictly color words but to a larger set of terms with color intent.

According some embodiments, for image retrieval, the color representation apparatus uses color profiles to retrieve images having higher relevance. The color profiles can increase search ranking in a setting. In the example above (i.e., the user searches for images of "wooden apple"), having an understanding that the apple should be brown and not red help prioritize amongst all the images of apples. As illustrated in FIG. 3, the second row of the images includes images or scenes that depict one or more red apples. Importantly, these apples are of the color red. The first row of the images includes images or scenes that depict one apple or apple-shaped apparatus. These apple-shaped apparatuses are of the color brown. Therefore, the image search engine retrieves the relevant images (i.e., the first row of the images) from a database or storage location and show the relevant images to the user for further actions.

Figure 4:
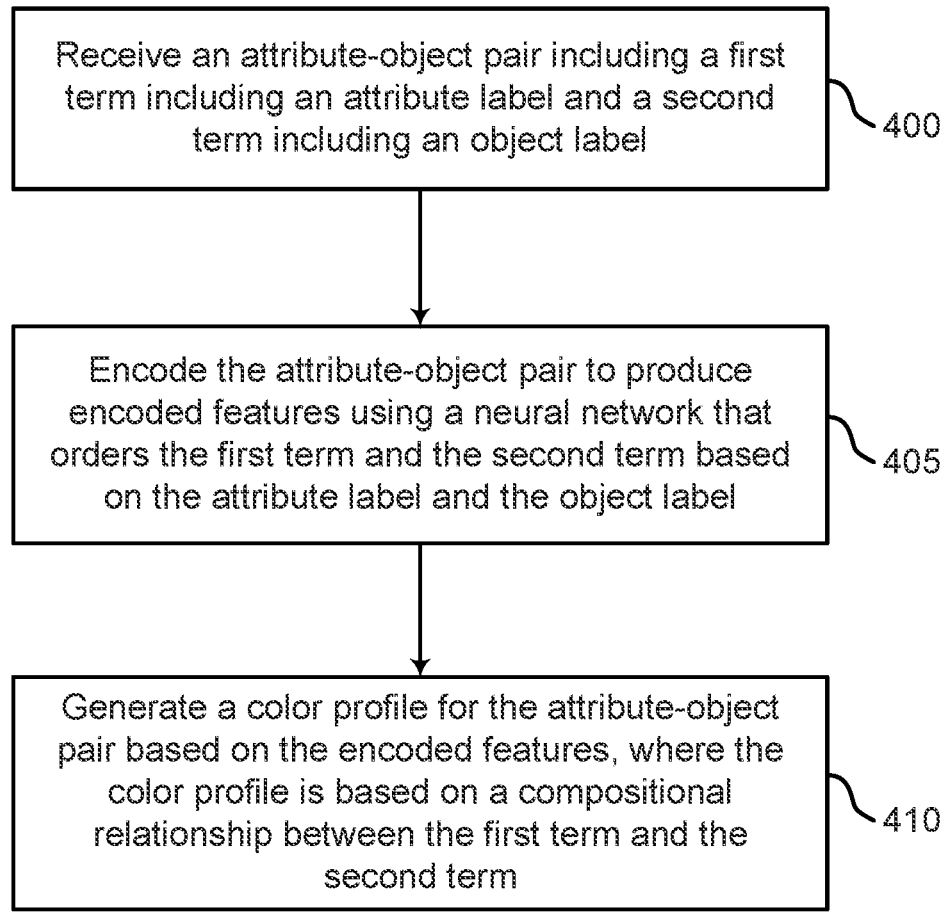
FIG. 4 shows an example of a process for color representation according to aspects of the present disclosure.

FIG. 4 shows an example of a process for color representation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 400, the system receives an attribute-object pair including a first term including an attribute label and a second term including an object label. In some cases, the operations of this step refer to, or may be performed by, a color representation apparatus as described with reference to FIG. 1.

According to an embodiment, the system curates a customized dataset based on Google's bigram corpus. The system begins by extracting attribute-object pairs from the bigrams. The system filters them using a seed set of colors and a hopping logic to retain pairs that have color implications. The system fetches images for the filtered set using an image search engine (e.g., Google® image search) such that corresponding images for each attribute-object pair are retrieved. Finally, the customized dataset is of the form (image, attribute-object pair). In some cases, the system retains exclusively descriptive adjectives and concrete nouns.

According to an embodiment, the system curates another customized dataset based on standard image captioning datasets, using a similar filtering logic. The system extracts attribute-object pairs from the captions. The system filters relevant pair using hoping logic so that relevant attribute-object pairs are extracted. From the images, the system crops out part corresponding to (attribute, object) in pair. In some cases, bounding boxes are used on the object for the extraction of less noisy color profiles.

At operation 405, the system encodes the attribute-object pair to produce encoded features using a neural network that orders the first term and the second term based on the attribute label and the object label. In some cases, the neural network is also referred to as a color representation network. The neural network includes an encoder and a decoder. The encoder is configured to encode an attribute-object pair to produce encoded features based on an ordering of a first term comprising an attribute label and a second term comprising an object label. The decoder is configured to generate a color profile for the attribute-object pair based on the encoded features, wherein the color profile is based on a compositional relationship between the first term and the second term. In some cases, the operations of this step refer to, or may be performed by, an encoder as described with reference to FIGS. 5 and 6.

At operation 410, the system generates a color profile for the attribute-object pair based on the encoded features, where the color profile is based on a compositional relationship between the first term and the second term. According to an embodiment, the color profile includes a human-interpretable color profile. The color profile may refer to a representation of which colors are relevant to the text query or the attribute-object pair. For example, a color profile may include an ordered list of colors with a value associated with each color, and may be represented as a histogram. In some cases, the operations of this step refer to, or may be performed by, a decoder as described with reference to FIGS. 5 and 6.

In some examples, the color representation network generates color profiles (and in some cases, the system displays the top colors for easier visualization). In some cases, the color representation network is also referred to as the neural network. The neural network captures context such that the attribute "hot" has different effects when modifying different objects such as "hot sun" and "hot pepper". The neural network also learns the notion of composition, for example, "young leaves" are rich in green color whereas "fallen leaves" are represented well in the brown-to-red spectrum. Furthermore, the neural network can highlight multiple colors. For the query "bright sun", the neural network is able to learn that on a bright day a golden yellow sun is visible in a blue sky. The neural network learns meaningful color representations for unseen combinations of attribute, object pairs. For "old gold" and "crimson velvet", the generated color profiles reasonably capture the semantics of the queries.

Example Color Representation Network

Figure 5:
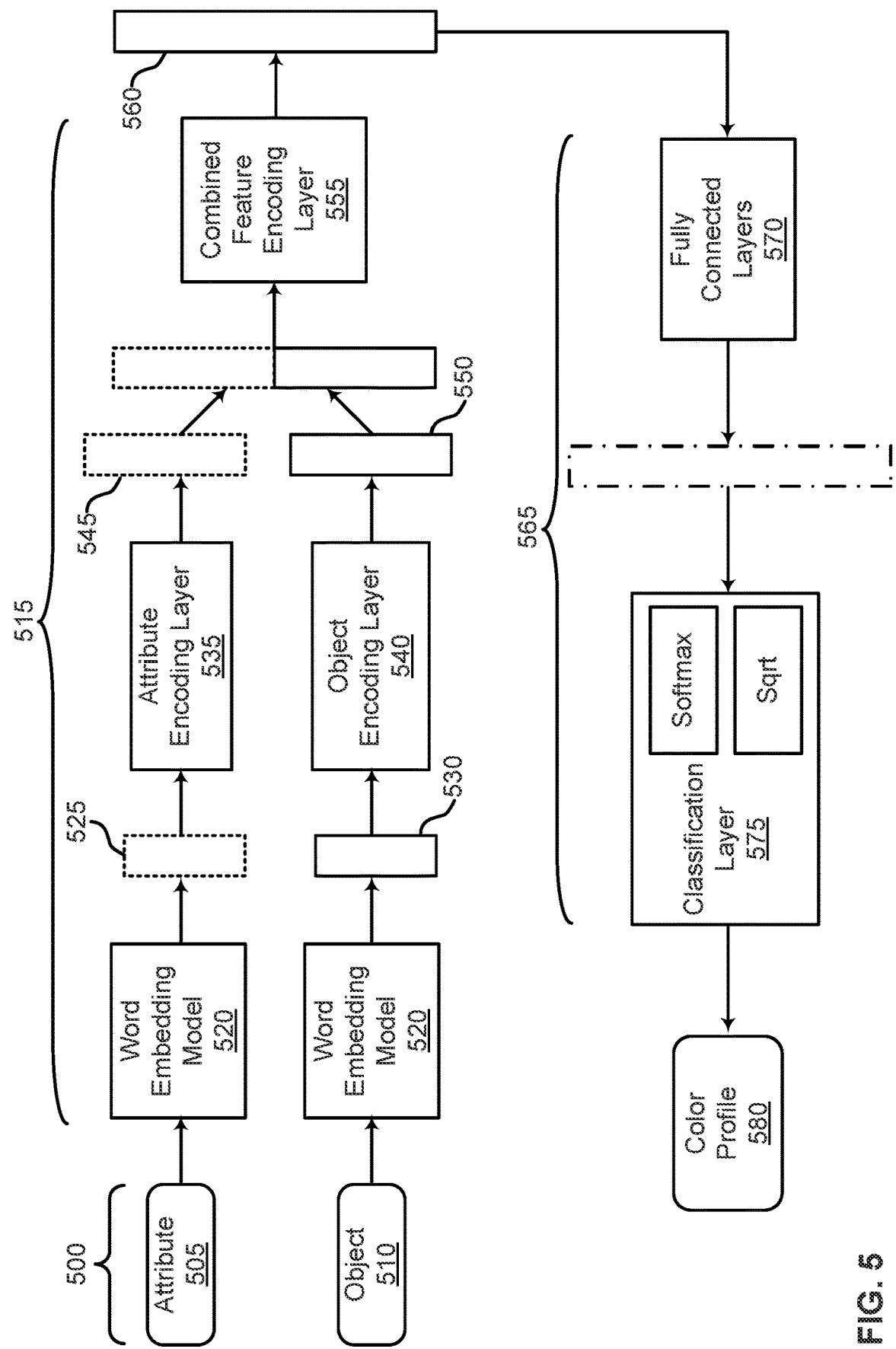
FIGS. 5 and 6 show examples of a color representation network according to aspects of the present disclosure.

FIG. 5 shows an example of a color representation network according to aspects of the present disclosure. The example shown includes attribute-object pair 500, encoder 515, decoder 565, and color profile 580.

According to some embodiments, encoder 515 is configured to encode an attribute-object pair 500 to produce encoded features 560 based on an ordering of a first term comprising an attribute label and a second term comprising an object label. In some examples, the encoder 515 includes a word embedding model 520, an attribute encoding layer 535, an object encoding layer 540, and a combined feature encoding layer 555. In some examples, the encoder 515 includes a word embedding model 520 and a LSTM layer (see FIG. 6). Encoder 515 is an example of, or includes aspects of, the corresponding element described with reference to FIG. 6.

In one embodiment, encoder 515 includes word embedding model 520, attribute embedding 525, object embedding 530, attribute encoding layer 535, object encoding layer 540, attribute features 545, object features 550, combined feature encoding layer 555, and encoded features 560. Word embedding model 520 is an example of, or includes aspects of, the corresponding element described with reference to FIG. 6. Attribute embedding 525 is an example of, or includes aspects of, the corresponding element described with reference to FIGS. 6, 15, and 16. Object embedding 530 is an example of, or includes aspects of, the corresponding element described with reference to FIGS. 6, 15, and 16. Combined feature encoding layer 555 is an example of, or includes aspects of, the corresponding element described with reference to FIGS. 15 and 16. Encoded features 560 is an example of, or includes aspects of, the corresponding element described with reference to FIG. 6.

Attribute-object pair 500 is an example of, or includes aspects of, the corresponding element described with reference to FIGS. 6, 15, and 16. In one embodiment, attribute-object pair 500 includes attribute 505 and object 510. In some cases, attribute 505 is also referred to as the first term. Object 510 is also referred to as the second term. Attribute 505 is an example of, or includes aspects of, the corresponding element described with reference to FIGS. 6, 15, and 16. Object 510 is an example of, or includes aspects of, the corresponding element described with reference to FIGS. 6, 15, and 16. In some cases, the color representation network is also referred to as a neural network, a text-to-color network, or a text-to-color model.

According to some embodiments, encoder 515 encodes the attribute-object pair 500 to produce encoded features 560 that orders the first term and the second term based on the attribute label and the object label. In some examples, encoder 515 embeds the first term and the second term using a word embedding model 520 to produce an attribute embedding 525 and an object embedding 530. Encoder 515 encodes the attribute embedding 525 and the object embedding 530 separately to produce attribute features 545 and object features 550, respectively. According to an embodiment, attribute embedding 525 is input to attribute encoding layer 535 to obtain attribute features 545. The object embedding 530 is input to the object encoding layer 540 to obtain the object features 550.

According to an embodiment, encoder 515 concatenates the attribute features 545 and the object features 550 using an attribute-object ordering. In some examples, encoder 515 encodes the attribute embedding and the object embedding together using an LSTM model (see FIG. 6).

According to an embodiment, the concatenated output based on the attribute features 545 and the object features 550 is input to the combined feature encoding layer 555 to produce the encoded features 560.

According to an embodiment, the color representation network is configured to generate color representations based on corresponding (attribute, object) pairs and the curated datasets are used for training the neural network. Some embodiments of the present disclosure train the color representation network, which takes the attribute and object as input and learns to predict the 1504-dimensional color profile vector as output.

According to an embodiment, the color representation network includes a label embed network model, which uses fully connected layers to predict color profile from attribute-object pairs. The label embed network model uses separate, fully connected layers for attribute and object embeddings (e.g., the attribute embedding 525 is a 300-dimensional vector, the object embedding 530 is a 300-dimensional vector). The outputs include the attribute features 545 (e.g., a 400-dimensional vector) and the object features 550 (e.g., a 400-dimensional vector). The outputs are then concatenated (e.g., the concatenated feature vector may be an 800-dimensional vector) and input to another fully connected network which outputs a 1504-dimensional vector. Then, the label embed network model adds a softmax layer for regularization and a square root (i.e., sqrt) layer to mimic the process of creating color profiles from images.

The softmax layer may also be referred to as a softmax function. According to an embodiment, the softmax function is used as the activation function of the neural network to normalize the output of the network to a probability distribution over predicted output classes or classifications. After applying the softmax function, each component of the feature map is in the interval (0, 1) and the components add up to one. These values are interpreted as probabilities.

Decoder 565 is an example of, or includes aspects of, the corresponding element described with reference to FIG. 6. In one embodiment, decoder 565 includes fully connected layers 570 and classification layer 575. The classification layer 575 includes a softmax layer for regularization and a square root (i.e., sqrt) layer. Fully connected layers 570 is an example of, or includes aspects of, the corresponding element described with reference to FIG. 6. Color profile 580 is an example of, or includes aspects of, the corresponding element described with reference to FIG. 6.

According to some embodiments, decoder 565 generates a color profile 580 for the attribute-object pair 500 based on the encoded features 560, where the color profile 580 is based on a compositional relationship between the first term and the second term. In some examples, decoder 565 decodes the encoded features 560, where the color profile 580 is an output of the decoding. In some examples, the color profile 580 includes a human-interpretable color profile. In some examples, the decoder 565 includes a set of fully connected layers 570.

Figure 6:
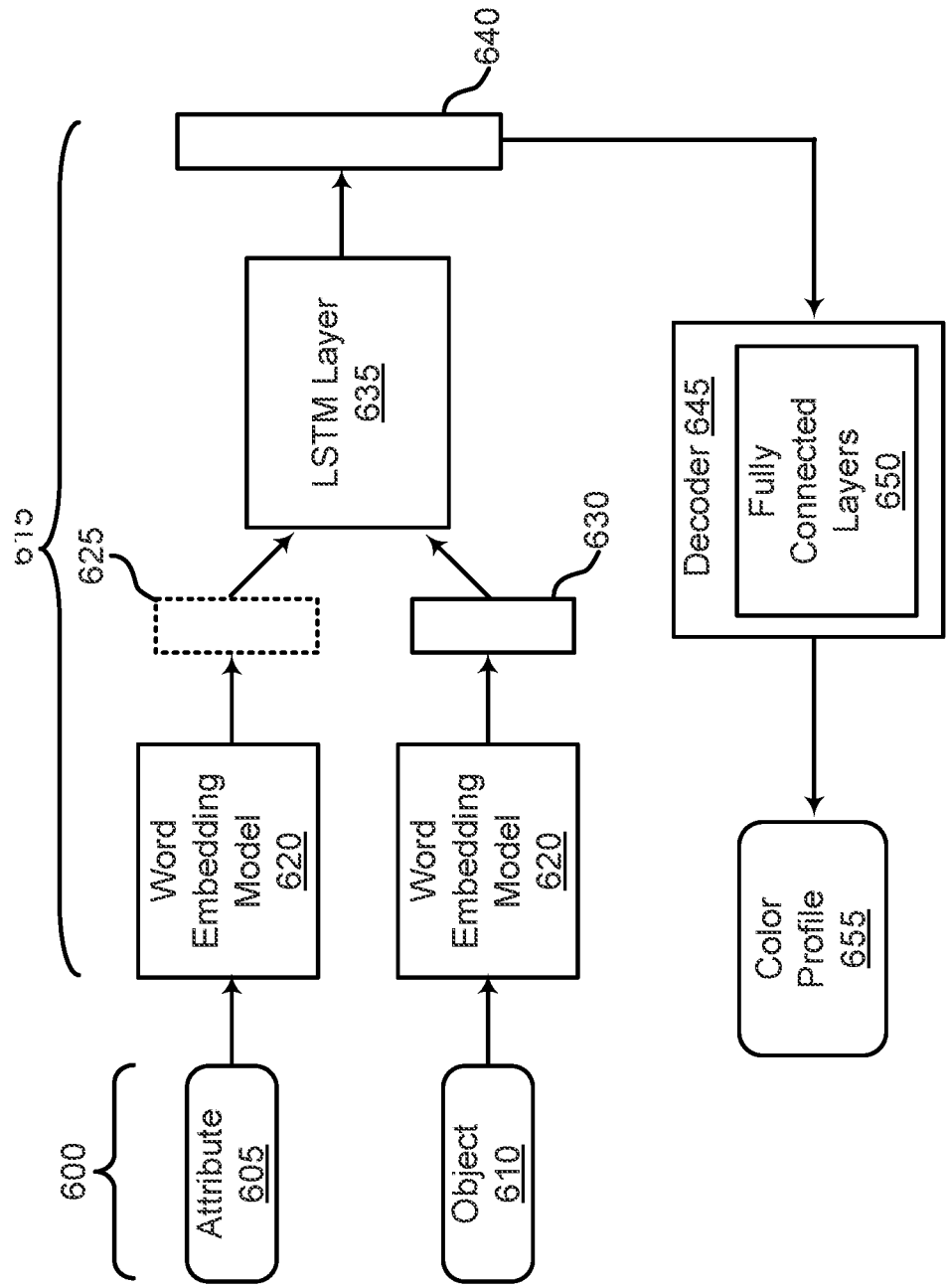

FIG. 6 shows an example of a color representation network according to aspects of the present disclosure. The example shown includes attribute-object pair 600, encoder 615, decoder 645, and color profile 655. In some cases, the color representation network is also referred to as a LSTM network model.

Attribute-object pair 600 is an example of, or includes aspects of, the corresponding element described with reference to FIGS. 5, 15, and 16. In one embodiment, attribute-object pair 600 includes attribute 605 and object 610. In some cases, attribute 605 is also referred to as the first term. Object 610 is also referred to as the second term. Attribute 605 is an example of, or includes aspects of, the corresponding element described with reference to FIGS. 5, 15, and 16. Object 610 is an example of, or includes aspects of, the corresponding element described with reference to FIGS. 5, 15, and 16.

In one embodiment, encoder 615 includes word embedding model 620, attribute embedding 625, object embedding 630, LSTM layer 635, and encoded features 640. Encoder 615 is an example of, or includes aspects of, the corresponding element described with reference to FIG. 5. Word embedding model 620 is an example of, or includes aspects of, the corresponding element described with reference to FIG. 5. Attribute embedding 625 is an example of, or includes aspects of, the corresponding element described with reference to FIGS. 5, 15, and 16. Object embedding 630 is an example of, or includes aspects of, the corresponding element described with reference to FIGS. 5, 15, and 16. Encoded features 640 is an example of, or includes aspects of, the corresponding element described with reference to FIG. 5. Decoder 645 is an example of, or includes aspects of, the corresponding element described with reference to FIG. 5.

In one embodiment, decoder 645 includes fully connected layers 650. Fully connected layers 650 are an example of, or includes aspects of, the corresponding element described with reference to FIG. 5. Color profile 655 is an example of, or includes aspects of, the corresponding element described with reference to FIG. 5.

According to an embodiment, the LSTM network model is used to predict color profile 655 from the attribute-object pair 600. The text embeddings are passed through an LSTM layer to capture the context of individual (attribute, object) embeddings. The LSTM network model includes fully connected layers to learn the final color profile 655.

A long short-term memory (LSTM) is a form of recurrent neural network (RNN) that includes feedback connections. In one example, and LSTM includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) problems when training an RNN.

Figure 12:
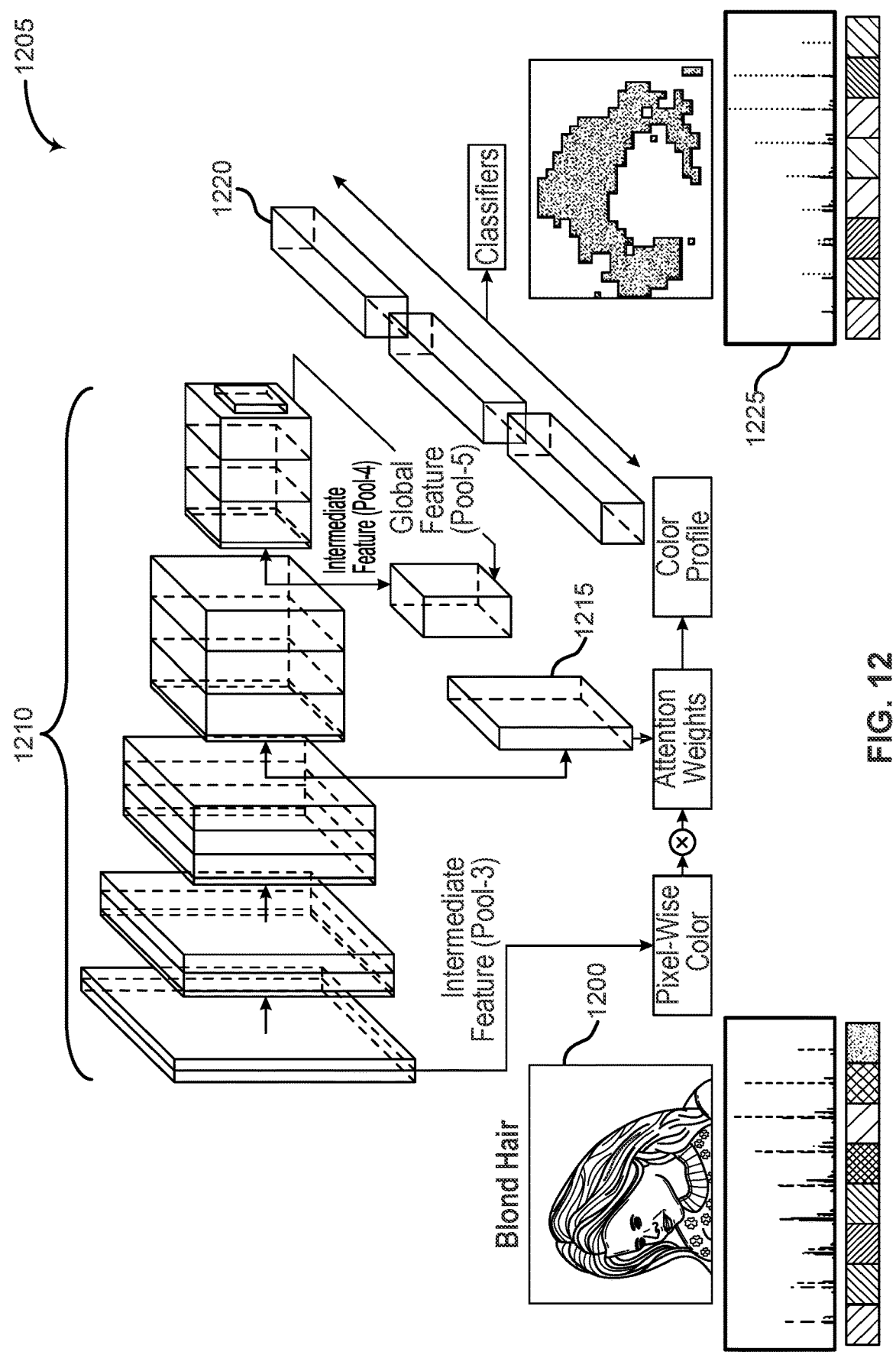
FIG. 12 shows an example of a color classifier including an attention layer according to aspects of the present disclosure.

According to an embodiment, the LSTM network model is trained using attention weighted color profiles (see FIG. 12). The text embedding is a trainable embedding matrix initialized by word embeddings (e.g., Glove word embeddings). The embedding matrices for attributes and nouns are different such that the model can learn compositionality in (attribute, object) pairs. The same word can have multiple interpretations depending on its part-of-speech (POS) tag. A Glove word embedding model is a global log-bilinear regression model that combines global matrix factorization and local context window techniques. The Glove word embedding model leverages statistical information by training exclusively on the nonzero elements in a word-word co-occurrence matrix, rather than on the entire sparse matrix or on individual context windows in a large corpus. Therefore, the model can produce a vector space with meaningful substructure.

Example Dataset Curation

Figure 7:
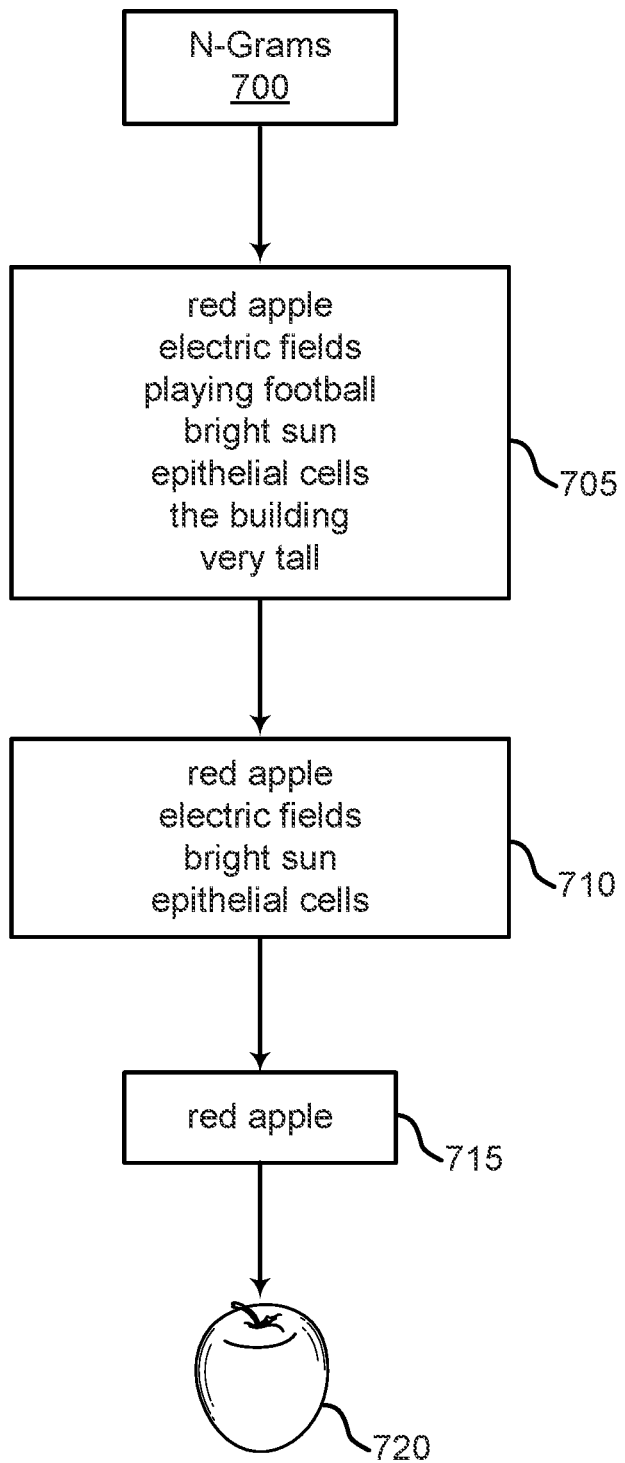
FIG. 7 shows an example of a process for creating a dataset using n-grams according to aspects of the present disclosure.

FIG. 7 shows an example of a process for creating a dataset using n-grams 700 according to aspects of the present disclosure. The example shown includes n-grams 700, bigrams 705, attribute-object pairs 710, relevant pairs 715, and retrieved images 720.

According to an embodiment, a dataset curation process using n-grams includes identifying a set of n-grams, filtering the set of n-grams based on the a number of words to produce a set of bigrams, filtering the set of bigrams based on linguistic type to produce the attribute-object pairs, and selecting a set of images by searching for images associated with the attribute-object pairs.

According to an example, the set of bigrams 705 includes a set of phrases having two words (e.g., red apple, electric fields, playing football, bright sun, etc.). The attribute-object pairs include "red apple", "electric fields", "bright sun", and "epithelial cells". A user is interested in searching for images associated with the attribute-object pair "red apple". Therefore, relevant pairs 715 are narrowed down to "red apple". The set of images include or depict a red apple as shown in FIG. 7.

Figure 8:
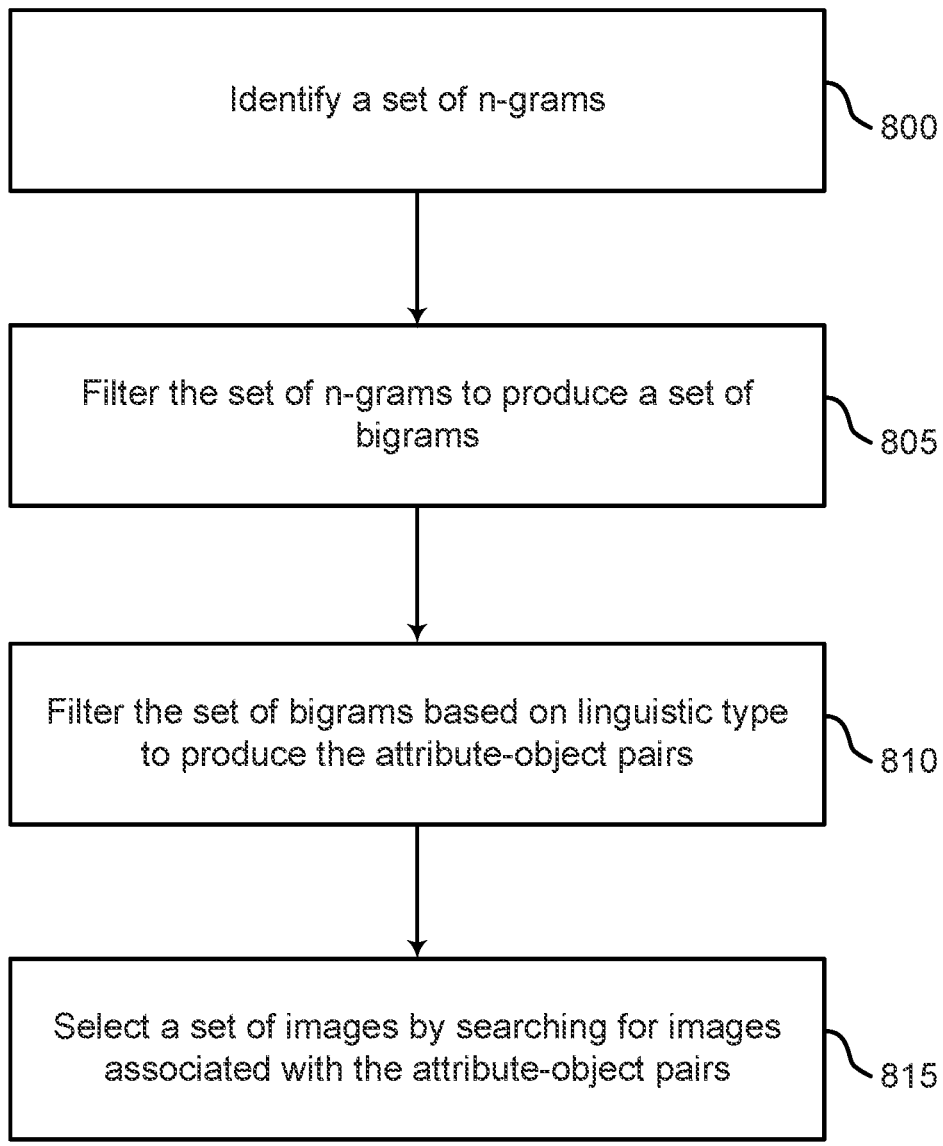
FIG. 8 shows an example of a process for creating a training set using n-grams according to aspects of the present disclosure.

FIG. 8 shows an example of a process for creating a training set using n-grams according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system identifies a set of n-grams. According to an embodiment, Google's n-gram dataset is used to create a training set. In some cases, the operations of this step refer to, or may be performed by, a data curation component as described with reference to FIG. 1.

At operation 805, the system filters the set of n-grams to produce a set of bigrams. According to an embodiment, a pipeline involves Google® bigrams dataset. The bigram corpus from Google's n-gram dataset contains the list of all contiguous sequence of two words present in the Google® corpus along with their frequency count. Each word has the corresponding parts-of-speech tag. In some cases, the operations of this step refer to, or may be performed by, a data curation component as described with reference to FIG. 1.

At operation 810, the system filters the set of bigrams based on linguistic type to produce the attribute-object pairs. According to an embodiment, based on the linguistic type of the constituent words, all phrases where the first word is identified as an adjective (attribute) and second word as a noun (object) are extracted. However, this may not handle non-visual concepts such as "old wisdom" or "European community". The system includes a filtering step using existing lists of concrete nouns and descriptive adjectives. This additional filtering is optional and may be omitted in case of captioning datasets because the (attribute, object) pairs are obtained from images and therefore the pairs automatically correspond to visual concepts. Images for every pair are retrieved by querying the Google® image search engine. In some cases, the operations of this step refer to, or may be performed by, a data curation component as described with reference to FIG. 1.

At operation 815, the system selects a set of images by searching for images associated with the attribute-object pairs. Images for every pair are retrieved by querying an image search engine (e.g., Google® image search engine). According to an example, a user wants to search for images that are related to red apple. The user may input "red apple" query into a search box of an image search engine. The image search engine returns images representing red apple as shown in FIG. 7. In some cases, the operations of this step refer to, or may be performed by, a database in conjunction with a search component as described with reference to FIG. 1.

Figure 9:
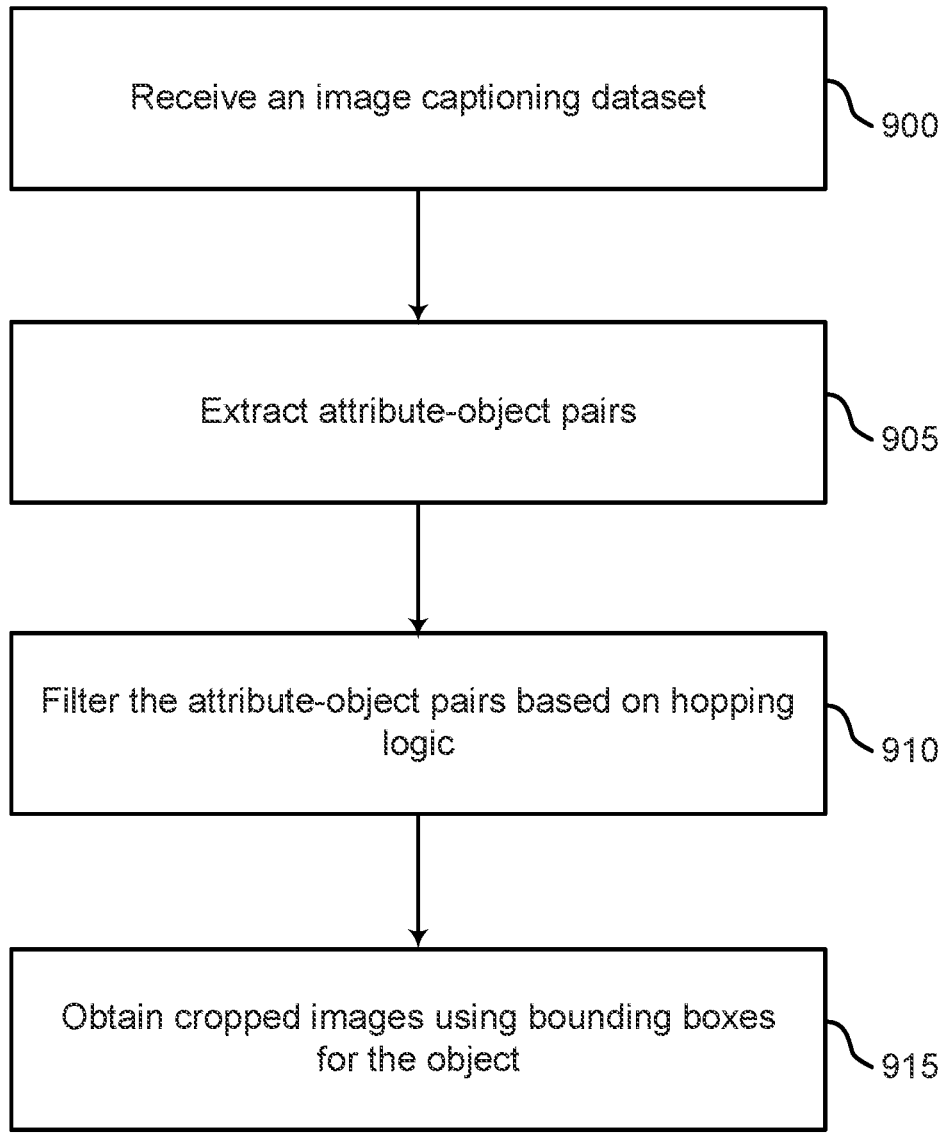
FIG. 9 shows an example of a process for creating a dataset using captioned images according to aspects of the present disclosure.

FIG. 9 shows an example of a process for creating a dataset using captioned images according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

To develop network models that generate rich color profiles from text using deep learning approach, datasets are designed to map (attribute, object) pairs to color-rich images. The datasets include a rich and diverse set of text phrases, which are related to (attribute, object) pairs, and these (attribute, object) pairs are not limited to trivial color mentions such as "red scarf" but also include implicit indicators such as "cranberry juice". Since there are no available public datasets to train neural networks of the present disclosure, a pipeline is provided to curate customized datasets that capture phrases with high color intent.

At operation 900, the system receives an image captioning dataset. According to some embodiments, several pipelines are configured to gather an initial set of commonly occurring (attribute, object) phrases. One pipeline involves image captioning datasets. In some cases, the operations of this step refer to, or may be performed by, a data curation component as described with reference to FIG. 1.

At operation 905, the system extracts attribute-object pairs. A neural network performs parts-of-speech (POS) tagging on the captions, and uses this to map images to (attribute, object) pairs. In some cases, the operations of this step refer to, or may be performed by, a data curation component as described with reference to FIG. 1.

At operation 910, the system filters the attribute-object pairs based on hopping logic. According to an embodiment, the system generates the set of all (attribute, object) pairs frequently occurring in public corpora (image or text datasets). However, some pairs are not desired because they have no color intent (e.g., "epithelial cells" or "electric fields"). To solve this, the system models this as a bipartite graph between attributes and objects and a hopping logic is provided to select relevant pairs. More detailed description of hopping logic is in FIG. 10. In some cases, the operations of this step refer to, or may be performed by, a data curation component as described with reference to FIG. 1.

At operation 915, the system obtains cropped images using bounding boxes for the object. According to an embodiment, availability of object bounding boxes in an image provides a natural grounding between the image and text and focus on specific regions of the image. In some examples, Flickr-30k dataset is used. In some cases, the operations of this step refer to, or may be performed by, a data curation component as described with reference to FIG. 1.

Figure 10:
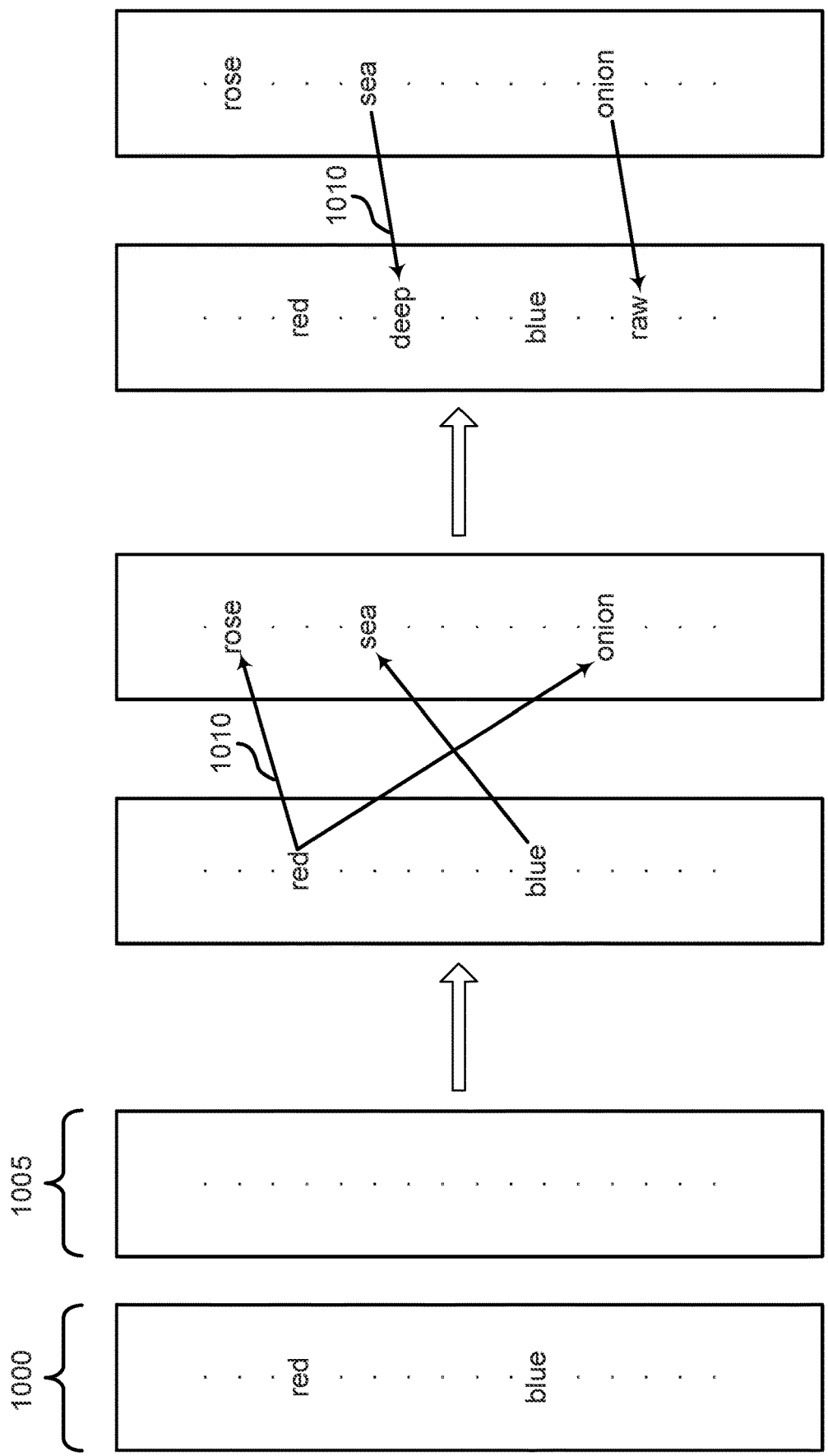
FIG. 10 shows an example of a process for filtering based on hopping logic according to aspects of the present disclosure.

FIG. 10 shows an example of a process for filtering based on hopping logic according to aspects of the present disclosure. The example shown includes attributes 1000, objects 1005, and hops 1010.

According to an embodiment, the system generates the set of all (attribute, object) pairs frequently occurring in public corpora (image or text datasets). However, some pairs are not desired because they have no color intent (e.g., "epithelial cells" or "electric fields"). To solve this, the system models this as a bipartite graph between attributes and objects and a hopping logic is provided to select relevant pairs. According to an example, attributes 1000 includes colors such as red, blue, etc. Objects 1005 includes rose, sea, onion, etc. Hops 1010 connect an attribute to an object (e.g., forming attribute-object pairs such as red rose, red onion, blue sea, etc.). Hops 1010 are also referred to as hopping logic. In some cases, hops 1010 include connecting an attribute to a corresponding object (i.e., the direction of hops 1010 is from the attribute to the corresponding object). In some other cases, hops 1010 include connecting an object to a corresponding attribute (i.e., the direction of hops 1010 is from the object to the corresponding attribute).

One embodiment begins with the eleven basic color terms as attributes and obtains the list of objects that occur most frequently with this set of seed colors. Next, the system uses these objects as starting points, and identifies the commonly occurring attributes. This completes one hop of the bipartite graph filtering. The iterations continue with multiple hops till a satisfactory number of (attribute, object) pairs have been selected.

To learn compositionality of attributes and objects, the system depends on sufficient combinations of every word. In one example, the system maintains a minimum of five unique attributes per object and also five objects per attribute. At the end of the dataset curation process, two datasets are generated with mappings from (attribute, object) pairs to images. The statistics of the final datasets are recorded. In one example, a method based on a Flickr-30k dataset may be used that includes two hops, 194 unique adjectives, 276 unique nouns, and 1017 pairs. In another example, a method based on a Google® Bigrams dataset may be used that includes two hops, 130 unique adjectives, 211 unique nouns, and 1460 pairs.

Figure 11:
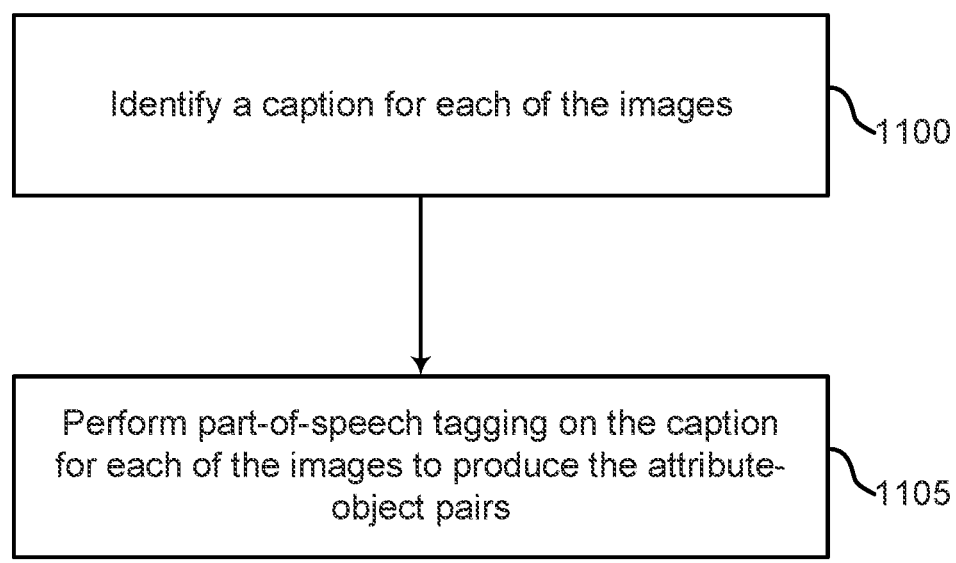
FIG. 11 shows an example of a process for creating a training set using captioned images according to aspects of the present disclosure.

FIG. 11 shows an example of a process for creating a training set using captioned images according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1100, the system identifies a caption for each of the images. In some cases, the operations of this step refer to, or may be performed by, a data curation component as described with reference to FIG. 1.

At operation 1105, the system performs part-of-speech tagging on the caption for each of the images to produce the attribute-object pairs. According to some embodiments, several different pipelines are used to gather an initial set of commonly occurring (attribute, object) phrases. One example includes image captioning datasets. The neural network performs parts-of-speech tagging on the captions, and uses this to map images to (attribute, object) pairs. In some examples, Flickr-30k dataset is used. In some cases, the operations of this step refer to, or may be performed by, a data curation component as described with reference to FIG. 1.

Example Training Techniques

FIG. 12 shows an example of a color classifier 1205 including an attention layer according to aspects of the present disclosure. The example shown includes image 1200, color classifier 1205, and image color profile 1225. Image 1200 is an example of, or includes aspects of, the corresponding element described with reference to FIGS. 15 and 16.

According to some embodiments, the color classifier 1205 includes a set of convolution layers 1210, one or more attention layers 1215, and a classification layer 1220, where the color classifier 1205 is configured to identify an image color profile 1225 for images 1200 in an image set by attending to relevant portions of each image 1200, and wherein attribute-object pairs associated with the image set are used together with the image color profile 1225 for training the neural network. Classification layer 1220 is an example of, or includes aspects of, the corresponding element described with reference to FIG. 5. Image color profile 1225 is an example of, or includes aspects of, the corresponding element described with reference to FIG. 16.

According to some embodiments, color classifier 1205 generates the ground truth color profile based on the image 1200 through a set of convolution layers 1210, one or more attention layers 1215, and a classification layer 1220.

As illustrated in FIG. 12, the color histogram representation is utilized. Each bar in the histogram is proportional to the fraction of pixels that belong to that color bin. In some cases, distances in LAB space are indicative of visually perceived changes, the LAB color space is divided uniformly across all three channels to create the color bins. The LAB color space is also known as the CIELAB color space (or CIE L*a*b*), which is a pre-defined color space. CIELAB expresses color as three values: L* for the lightness from black (0) to white (100), a* from green (−) to red (+), and b* from blue (−) to yellow (+). CIELAB was designed so that the same amount of numerical change in these values corresponds to roughly the same amount of visually perceived change.

According to an embodiment, the resolution is increased by concatenating histograms constructed with different intervals. In some cases, two histograms are combined with number of bins along [L, A, B] axes as [9, 7, 8] and [10, 10, 10], resulting in the final unrolled histogram length as 9*7*8+10*10*10=504+1000=1504. Combination of the two histograms solves the ambiguity rooted in different bin sizes along the [L, A, B] channels. One example shows a visualization of the 1504 color bins. This example demonstrates repeating trend of the first 504 and last 1000 bins, a result of concatenating histograms from two different LAB space divisions.

In addition to using a perceptually uniform color space, a distance function is used to measure or compare between these histograms that reasonably capture the differences perceived with respect to human color vision. Computing the L2 distance between the square root histograms corresponds to computing the Hellinger kernel between the two histograms. Therefore, the distance function and transformation are the L2 distance and square root function respectively. For the transformed histogram, the value at each bin is equal to the square root of the fraction of pixels occurring in that bin. In some examples, representative palettes are extracted from the histograms clustering similar shades together and sampling periodically from the resulting histogram. This results in a diverse summary that captures most shades being represented in the original histogram. One example shows an image and color histogram for "coralline sea". This example demonstrates that the purple and blue bins have the highest peaks while colors like brown have smaller contributions compared to purple and blue colors.

According to some embodiments, the color classifier 1205 is configured to model visual attention for improved color representations. The representation above assigns uniform importance to all the pixels in the image. However, conditioned on the query, only certain parts of the image are relevant, and it is important to identify these parts of the image to extract cleaner color profiles. To solve such tasks, according to some embodiments, the color classifier 1205 includes a CNN-based classification model, which internally uses visual attention to focus on parts of images. The color classifier 1205 takes an image 1200 as input and predicts the attribute and object, while simultaneously learning an attention map over the image. The normalized attention weights are used to obtain improved color profiles (i.e., image color profile 1225) by assigning differential importance to individual pixels. In some examples, focusing on relevant part of the image for the query "blond hair" produces a less-noisy color profile with peaks towards blond and ignores the blue in the irrelevant parts of the image. In some cases, the color classifier 1205 is also referred to as a neural network.

According to an embodiment, the color classifier 1205 includes the following components. The backbone of the color classifier 1205 includes a VGG-16 model and two different attention modules are applied at different intermediate stages. The learned attention weights and global features are average-pooled to obtain the feature vectors. The concatenated features are then input to two different classifiers, one for object and one for attribute (i.e., an object classifier and an attribute classifier). The object or attribute classifier is a fully connected neural network which predicts class scores or relevance for all objects (attributes). The color classifier 1205 (i.e., the neural network) is trained using cross-entropy loss on one-hot encoded labels for both objects and attributes given an image. Once the color classifier 1205 is trained, the attention weights are extracted, and the color classifier 1205 performs a pixel-wise multiplication to obtain weighted color profiles.

According to an embodiment, the individual attention modules are a function of both intermediate representations $\mathcal{F}$ and global image features $\mathcal{G}$. The global features are up-sampled to align spatial size and followed by an element-wise addition with intermediate features to get an attention map $\mathcal{A}$ of the corresponding spatial feature space. The output of the attention module is an attention weighted feature space $\widehat{\mathcal{F}}$ i.e., the pixel-wise product of the attention map and intermediate features. Mathematically, $$\mathcal{R} = W * \text{ReLU}(w_f * \mathcal{F} + up(W_g * \mathcal{G})) \quad (1)$$

$$\mathcal{A} = \text{Sigmoid}(\mathcal{R}) \quad (2)$$

$$\widehat{\mathcal{F}} = \mathcal{A} \times \mathcal{F} \quad (3)$$

where +, × denote element-wise operations, * represents a convolution operation, $W$, $W_f$, $W_g$ are convolutional kernels, and up(·) indicates up-sampling using bilinear interpolation.

Figure 13:
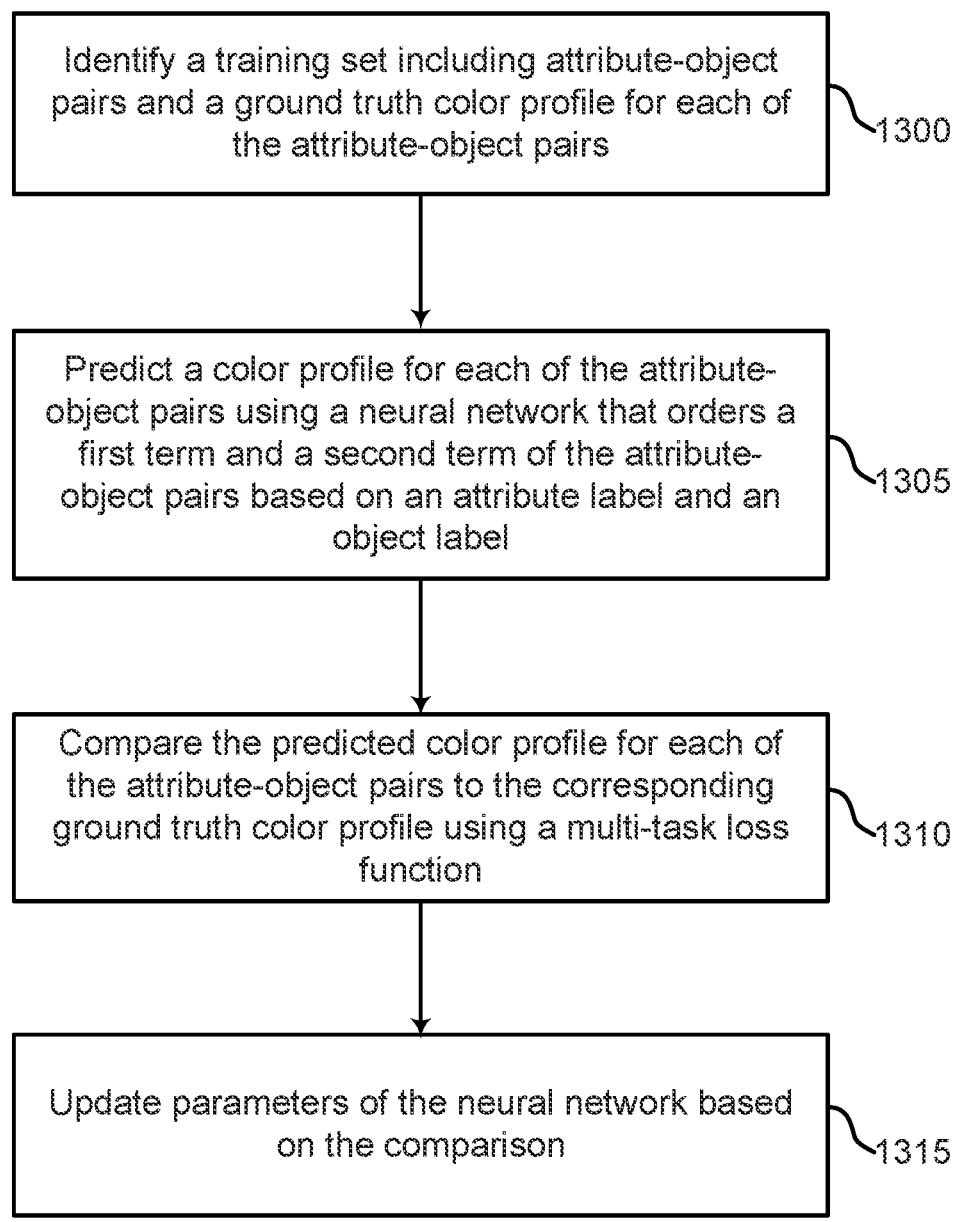
FIGS. 13 and 14 show examples of a process for training a neural network for color representation according to aspects of the present disclosure.

FIG. 13 shows an example of a process for training a neural network for color representation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1300, the system identifies a training set including attribute-object pairs and a ground truth color profile for each of the attribute-object pairs. In some cases, the operations of this step refer to, or may be performed by, a training component as described with reference to FIG. 1.

At operation 1305, the system predicts a color profile for each of the attribute-object pairs using a neural network that orders a first term and a second term of the attribute-object pairs based on an attribute label and an object label. In some cases, the first term represents an attribute, and the second term represents an object. In some cases, the operations of this step refer to, or may be performed by, a color representation apparatus as described with reference to FIG. 1.

At operation 1310, the system compares the predicted color profile for each of the attribute-object pairs to the corresponding ground truth color profile using a multi-task loss function. In some cases, the operations of this step refer to, or may be performed by, a training component as described with reference to FIG. 1.

According to an embodiment, the text-to-color networks (see FIGS. 5 and 6) are trained based on multiple loss functions. In an embodiment, text-to-color networks are trained using L2 loss, which is a simple mean squared error between the color profiles. In some cases, the text-to-color network is also referred to as the color representation network.

According to an embodiment, text-to-color networks are trained using triplet loss. Triplet loss function is leveraged in the contrastive learning paradigm and is used in vision tasks. It takes a positive and negative sample and tries to minimize the distance of the anchor from the positive and maximize the distance from the negative, with a margin.

$$L_{triplet}(A,P,N) = [d(A,P) - d(A,N) + m]_+ \quad (4)$$

where A, P, N represent the color profiles of the anchor, positive and negative samples, d(·) denotes the L2 distance between profiles and m is the margin hyperparameter. For every anchor histogram of class (attribute, object), the positive is a randomly sampled histogram of the same class, while the negative histogram is randomly sampled from any other (attribute, object) classes.

According to an embodiment, text-to-color networks are trained based on quintuplet loss. In some cases, this is also known as contrastive learning. The quintuplet loss is an extension of the triplet loss. It considers one negative belonging to some other (attribute, object) class and two semi negatives, which have either the same attribute or the same object as the anchor. The loss is a weighted sum of three triplet components formulated as follows:

$$L_{quin}(A,P,N,N_o,N_a) = \lambda_1 L_{triplet}(A,P,N) + \lambda_2 L_{triplet}(A,P,N_o) + \lambda_3 L_{triplet}(A,P,N_a) \quad (5)$$

where A, P, N, $N_o$, $N_a$ represent the color profiles of the anchor, positive, negative, semi-negative with same object class and semi-negative with same attribute class, and $\lambda_1$, $\lambda_2$, $\lambda_3$ are the weight hyperparameters such that $\lambda_1 > \lambda_2 = \lambda_3$.

At operation 1315, the system updates parameters of the neural network based on the comparison. In some cases, the operations of this step refer to, or may be performed by, a training component as described with reference to FIG. 1.

Figure 14:
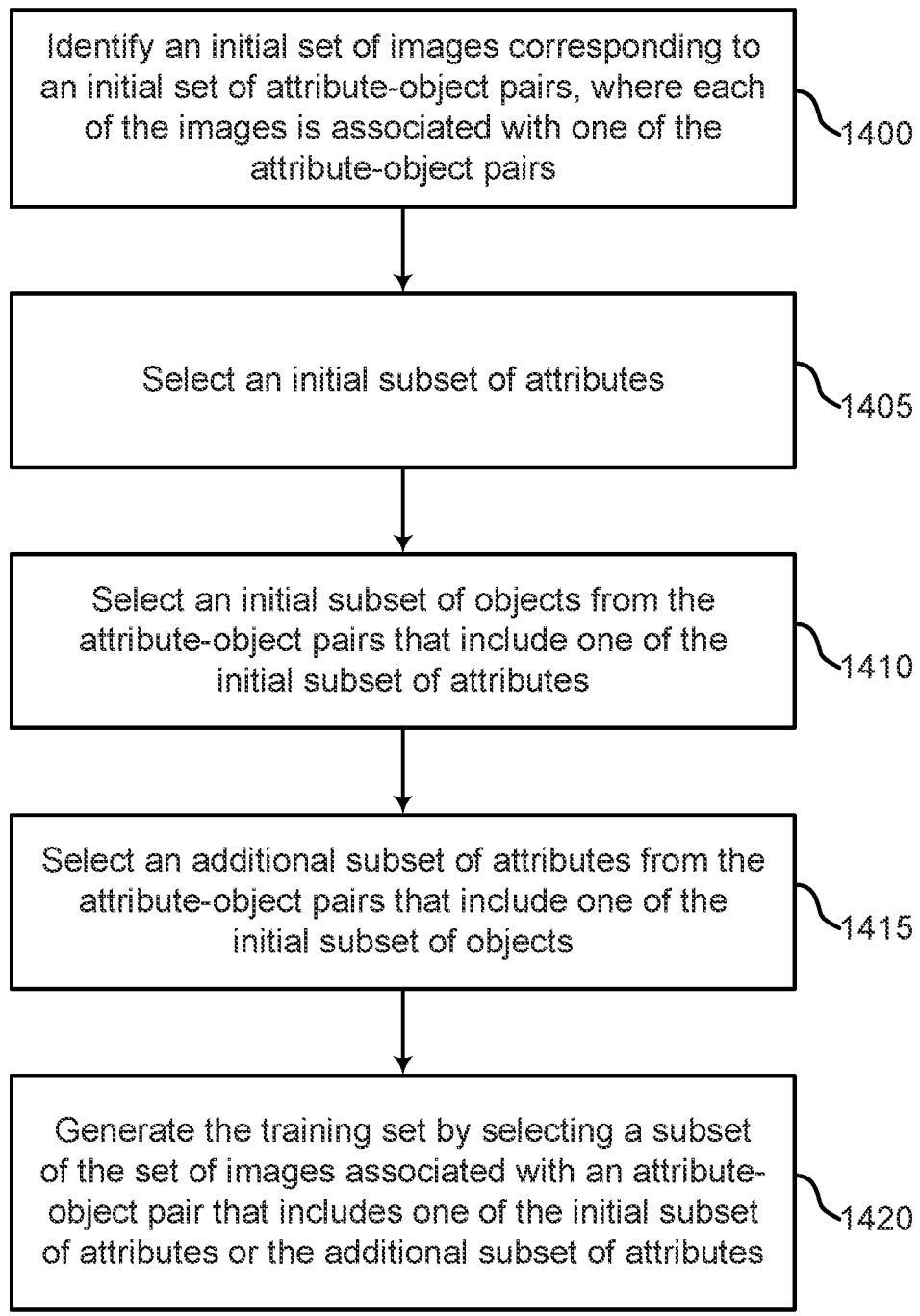

FIG. 14 shows an example of a process for training a neural network for color representation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1400, the system identifies an initial set of images corresponding to an initial set of attribute-object pairs, where each of the images is associated with one of the attribute-object pairs. In some cases, the operations of this step refer to, or may be performed by, a data curation component as described with reference to FIG. 1.

At operation 1405, the system selects an initial subset of attributes. In some cases, the operations of this step refer to, or may be performed by, a data curation component as described with reference to FIG. 1.

At operation 1410, the system selects an initial subset of objects from the attribute-object pairs that include one of the initial subset of attributes. In some cases, the operations of this step refer to, or may be performed by, a data curation component as described with reference to FIG. 1.

At operation 1415, the system selects an additional subset of attributes from the attribute-object pairs that include one of the initial subset of objects. In some cases, the operations of this step refer to, or may be performed by, a data curation component as described with reference to FIG. 1.

At operation 1420, the system generates the training set by selecting a subset of the set of images associated with an attribute-object pair that includes one of the initial subset of attributes or the additional subset of attributes. In some cases, the operations of this step refer to, or may be performed by, a training component as described with reference to FIG. 1.

Example Rankine and Evaluation Results

The color profiles are predicted by the color representation network based on textual queries. The color representation network (i.e., a neural network) captures context, for example, the attribute "hot" has different effects when modifying different objects such as "sun", "pepper" and "coffee". The neural network also learns the notion of composition—"young leaves" are rich in green color while "fallen leaves" are represented well in the brown-to-red spectrum and "citrus leaves" are more yellowish. It also learns meaningful color representations for unseen combinations of (attribute, object) pairs. For "old gold", "crimson velvet" and "tangerine orange", the generated color profiles reasonably capture the semantics of the queries. This demonstrates effective zero-shot learning of the neural network. The neural network is able to highlight multiple colors. For the query "bright sun", the neural network can learn that on a bright day, a golden yellow sun is visible in a blue sky. The neural network can learn a similar thing for queries "orange tree" and "coralline material".

Some examples illustrate that the color representation network (i.e., the neural network) can learn composition of attribute-object combinations, considering the context. The neural network captures the effect of different qualifiers such as "dark", "light", "pale". In some cases, the color of "red apple" and "green apple" is guided by the explicit color mentioned in the queries/attribute labels (i.e., red, green), while the neural network can learn that the color of "apple juice" is yellowish and that "apple tree" is similar to other trees and hence an apple tree has green and brown shades.

According to an embodiment, color is used as a feature in image retrieval and classification. To evaluate the usefulness of color features and the performance of the text-to-color models (see FIGS. 5 and 6), one embodiment includes an image search setup, which is configured to rank images for a query (e.g., an attribute-object pair) as well as image classification tasks. Evaluation includes comparing a first ranking component (i.e., a baseline model) that does not explicitly use color features with a second ranking component that use color features from the image modality, and a third ranking component that uses color features derived from both image and text modality. In some cases, the first, second, and third ranking component are also referred to as a first, second, and third network model, respectively.

To evaluate the significance of color itself, a ground truth color representation for (attribute, object) phrases is defined and the ground truth color representation is used as input to the network. The performance of the text-to-color models are evaluated by leveraging the model predictions instead of ground truth color representations in an end-to-end framework.

Figure 15:
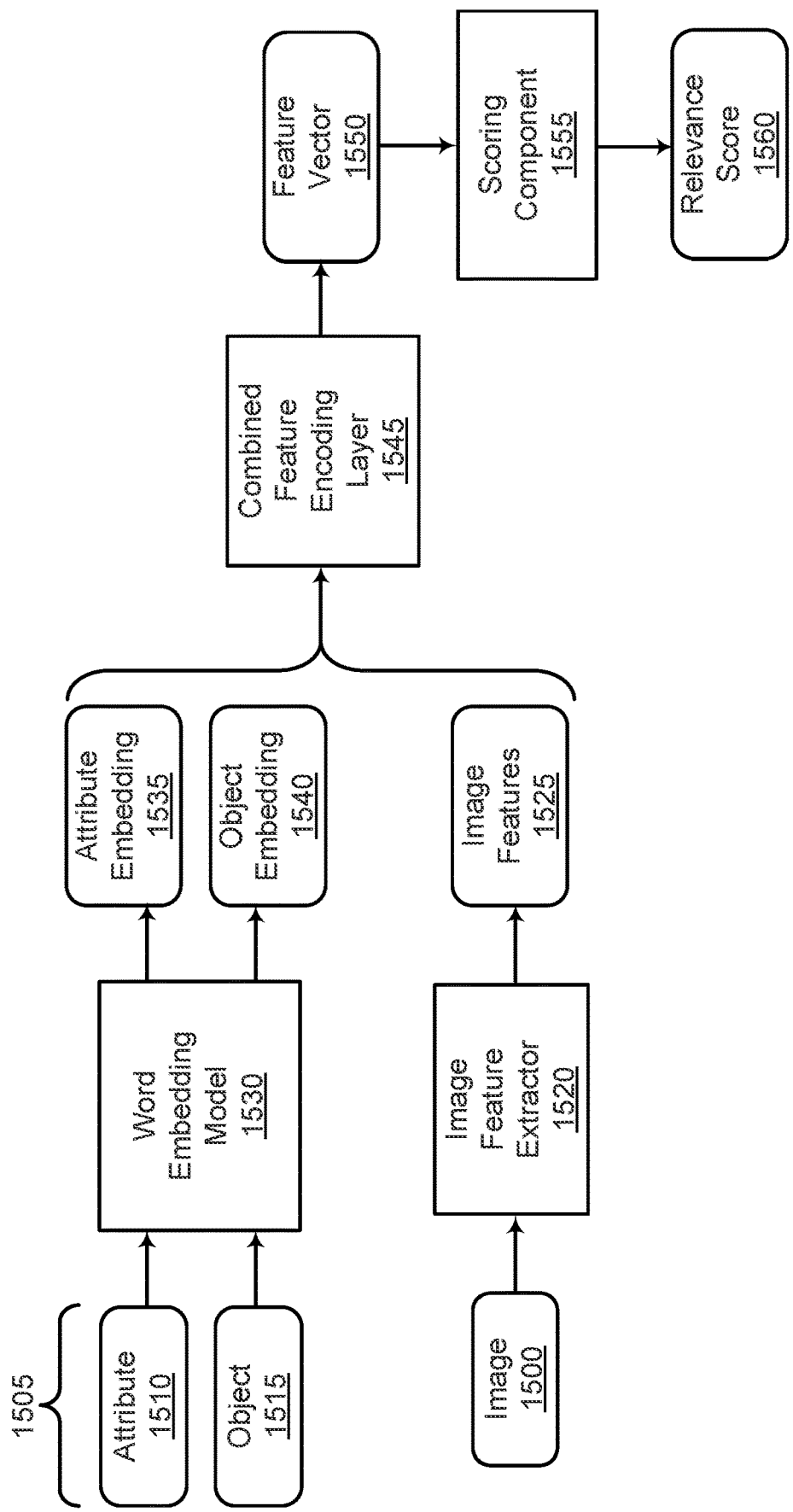
FIG. 15 shows an example of a ranking component without a color profile according to aspects of the present disclosure.

FIG. 15 shows an example of a ranking component without a color profile according to aspects of the present disclosure. The example shown includes image 1500, attribute-object pair 1505, image feature extractor 1520, image features 1525, word embedding model 1530, attribute embedding 1535, object embedding 1540, combined feature encoding layer 1545, feature vector 1550, scoring component 1555, and relevance score 1560.

According to an embodiment, network models include image modality and text modality as input. In some cases, image modality includes a ResNet embedding, a color profile, or a combination of both. Text modality includes a Glove embedding, a color profile, or a combination of both. A first network model may include a ResNet embedding and Glove embedding as input. A second network model may include a ResNet embedding, a color profile (image modality), and a Glove embedding as input. A third network model may include a ResNet embedding, a color profile (for image modality), a Glove embedding, and a color profile (for text modality) as input.

As illustrated in FIG. 15, the ranking component (i.e., the first network model mentioned above) may include a ResNet embedding and a Glove embedding as input.

According to an embodiment, the ranking component includes the image feature extractor 1520, the word embedding model 1530, the combined feature encoding layer 1545 and the scoring component 1555, where the ranking component is configured to generate the relevance score 1560 for the attribute-object pair 1505 and the image 1500. Image 1500 is an example of, or includes aspects of, the corresponding element described with reference to FIGS. 12 and 16.

In one embodiment, attribute-object pair 1505 includes attribute 1510 and object 1515. Attribute-object pair 1505 is an example of, or includes aspects of, the corresponding element described with reference to FIGS. 5, 6, and 16. Attribute 1510 is an example of, or includes aspects of, the corresponding element described with reference to FIGS. 5, 6, and 16. Object 1515 is an example of, or includes aspects of, the corresponding element described with reference to FIGS. 5, 6, and 16.

According to an embodiment, the attribute 1510 and the object 1515 are input the word embedding model 1530 (e.g., Glove word embedding model), which outputs the attribute embedding 1535 and the object embedding 1540, respectively. Image 1500 is input to the image feature extractor 1520, which outputs image features 1525. Image feature extractor 1520 is an example of, or includes aspects of, the corresponding element described with reference to FIG. 16. Image features 1525 is an example of, or includes aspects of, the corresponding element described with reference to FIG. 16. Word embedding model 1530 is an example of, or includes aspects of, the corresponding element described with reference to FIGS. 5, 6, and 16. Attribute embedding 1535 is an example of, or includes aspects of, the corresponding element described with reference to FIGS. 5, 6, and 16. Object embedding 1540 is an example of, or includes aspects of, the corresponding element described with reference to FIGS. 5, 6, and 16.

According to an embodiment, the attribute embedding 1535 and the object embedding 1540, and the image features 1525 are input to the combined feature encoding layer 1545, which outputs feature vector 1550. The combined feature encoding layer 1545 is an example of, or includes aspects of, the corresponding element described with reference to FIGS. 5 and 16. The feature vector 1550 is an example of, or includes aspects of, the corresponding element described with reference to FIG. 16.

According to an embodiment, the feature vector 1550 is input to the scoring component 1555, which outputs relevance score 1560. The scoring component 1555 is an example of, or includes aspects of, the corresponding element described with reference to FIG. 16. Relevance score 1560 is an example of, or includes aspects of, the corresponding element described with reference to FIG. 16.

Figure 16:
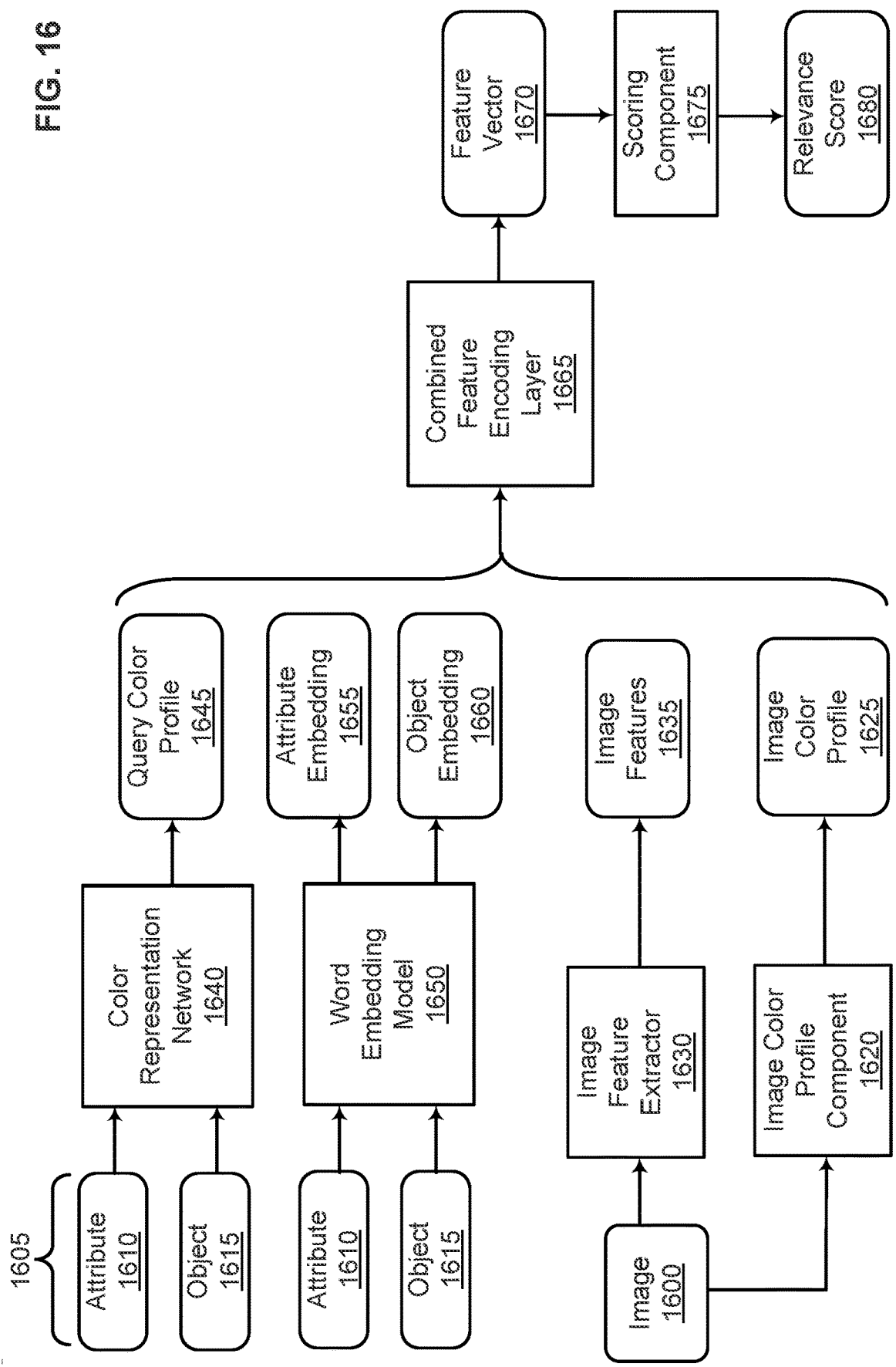
FIG. 16 shows an example of a ranking component including a color profile according to aspects of the present disclosure.

FIG. 16 shows an example of a ranking component including a color profile according to aspects of the present disclosure. The example shown includes image 1600, attribute-object pair 1605, image color profile component 1620, image color profile 1625, image feature extractor 1630, image features 1635, color representation network 1640, query color profile 1645, word embedding model 1650, attribute embedding 1655, object embedding 1660, combined feature encoding layer 1665, feature vector 1670, scoring component 1675, and relevance score 1680. The ranking component as illustrated in FIG. 16 may be referred to as a multi-modal neural network or simply a network model hereinafter.

Multiple multi-modal neural networks are trained to learn to distinguish between relevant and irrelevant images given a textual query. Given a (attribute, object) pair and an image, a network model learns to predict a relevance score between the two. The inputs to the network model will be described in greater detail below.

According to an embodiment, network models include image modality and text modality as input. In some cases, image modality includes a ResNet embedding, a color profile, or a combination of both. Text modality includes a Glove embedding, a color profile, or a combination of both. In one example, a first network model may include a ResNet embedding and a Glove embedding as input. A second network model may include a ResNet embedding, a color profile (image modality), and a Glove embedding as input. A third network model may include a ResNet embedding, a color profile (for image modality), a Glove embedding, and a color profile (for text modality) as input.

As illustrated in FIG. 16, the ranking component (i.e., the third network model mentioned above) includes a ResNet embedding, a color profile (for image modality), a Glove embedding, and a color profile (for text modality) as input. According to an embodiment, the ranking component includes the image feature extractor 1630, the image color profile component 1620, the word embedding model 1650, the color representation network 1640 and the scoring component 1675, where the ranking component is configured to generate a relevance score 1680 for attribute-object pair 1605 and image 1600.

According to an embodiment, image 1600 is input to the image feature extractor 1630 to obtain the image features 1635. The same image 1600 is input to the image color profile component 1620 to obtain the image color profile 1625. Image 1600 is an example of, or includes aspects of, the corresponding element described with reference to FIGS. 12 and 15. Image color profile 1625 is an example of, or includes aspects of, the corresponding element described with reference to FIG. 12. Image feature extractor 1630 is an example of, or includes aspects of, the corresponding element described with reference to FIG. 15. Image features 1635 is an example of, or includes aspects of, the corresponding element described with reference to FIG. 15.

In one embodiment, attribute-object pair 1605 includes attribute 1610 and object 1615. Attribute-object pair 1605 is an example of, or includes aspects of, the corresponding element described with reference to FIGS. 5, 6, and 15. Attribute 1610 is an example of, or includes aspects of, the corresponding element described with reference to FIGS. 5, 6, and 15. Object 1615 is an example of, or includes aspects of, the corresponding element described with reference to FIGS. 5, 6, and 15.

According to an embodiment, attribute 1610 and object 1615 are input to the color representation network 1640 to produce the query color profile 1645. The same attribute 1610 and the same object 1615 are input to the word embedding model 1650 to produce the attribute embedding 1655 and the object embedding 1660, respectively. The color representation network 1640 is an example of, or includes aspects of, the corresponding element described with reference to FIGS. 1, 5, and 6. Word embedding model 1650 is an example of, or includes aspects of, the corresponding element described with reference to FIGS. 5, 6, and 15. Attribute embedding 1655 is an example of, or includes aspects of, the corresponding element described with reference to FIGS. 5, 6, and 15. Object embedding 1660 is an example of, or includes aspects of, the corresponding element described with reference to FIGS. 5, 6, and 15.

According to an embodiment, the image features 1635, the image color profile 1625, the query color profile 1645, the attribute embedding 1655, and the object embedding 1660 are input to the combined feature encoding layer 1665 to obtain the feature vector 1670. Then, the feature vector 1670 is input to the scoring component 1675 to obtain the relevance score 1680. Combined feature encoding layer 1665 is an example of, or includes aspects of, the corresponding element described with reference to FIGS. 5 and 15. Feature vector 1670 is an example of, or includes aspects of, the corresponding element described with reference to FIG. 15. Scoring component 1675 is an example of, or includes aspects of, the corresponding element described with reference to FIG. 15. Relevance score 1680 is an example of, or includes aspects of, the corresponding element described with reference to FIG. 15.

According to an example, to obtain input features for the image, a pretrained ResNet152 model is used. For the text modality, the ranking component leverages trainable Glove embeddings for the attribute and object words of the query. For the color profile of images, the ranking component extracts the attention-weighted LAB space histograms. For the color encoding on the text modality, the ranking component obtains the ground truth histogram as the average histogram over all relevant images for that query. In some cases, the ranking component uses or leverages the outputs from the trained text-to-color networks.

According to an embodiment, the network models include initial modality specific layers for both image and text, followed by a fully-connected network to combine information from both modalities, and a final layer to output the relevance score.

According to an embodiment, the ranking component includes a query "crimson velvet" as input. Based on the query, color profile and word embeddings are generated and are then input to the ranking component. The ranking component also includes an image as input. Based on the image, color profile and Glove embeddings are generated and are then input to the ranking component as well. In some cases, a ResNet feature extractor is used in the ranking component. The output of the ranking component is a relevance score. The ranking component provides a measure or assessment for validation.

To evaluate a color-centric feature, a controlled setup is implemented (i.e., a simple baseline which achieves reasonable accuracy). In some cases, the ranking component might not be dependent on additional meta-data, such as image tags and captions, which are used in content-based information retrieval (CBIR) systems such as Adobe® Stock.

According to some embodiments, the ranking component is trained by optimizing on the following loss function equation:

$$\mathcal{L}_{RankNet} = \sum_{j,k}^{m} y_{jk} * \log y'_{jk} + (1 - y_{jk}) * \log(1 - y'_{jk}) \quad (6)$$

where $y'_{jk} = p(s^j > s^k) = \sigma(s^j - s^k)$ indicates the probability of result j being ranked higher than result k. For each relevant image j of an (attribute, object) query, the framework randomly samples a non-relevant image k. Target labels $y_{jk}$ are obtained from the dataset by setting $y_{jk} = 1$ if the image j was relevant for the query and k was not. The relevance scores predicted by the model are denoted by $s^j$ and $s^k$ and $\sigma(x)$ is the sigmoid function. The final loss function is the cross-entropy loss on the event of having relevance scores in the correct order.

The performance of the ranking component (also referred to as the network model) is measured based on standard information retrieval (IR) metrics, i.e., area under the ROC curve (AUC), mean average precision (mAP) and mean R-precision (mRP). These metrics are defined as follows. Area under the ROC curve (AUC) is the area under the receiver operating characteristic (ROC) curve from prediction scores. It is used in machine learning to compare multiple models. In addition, mean R-precision is defined as the precision at the point where the last relevant item of a given query is retrieved. For a particular query, this can be expressed as follows:

$$RP = \frac{1}{R} \cdot \sum_{i=1}^{R} x_i \quad (7)$$

where $x_i = 1$ if the $i^{th}$ retrieved image is relevant, 0 otherwise and R is the total number of relevant images.

Mean average precision (mAP) is defined as the mean of precision scores obtained after each relevant image is retrieved. Mathematically, it is formulated as follows:

$$AP = \frac{1}{R} \cdot \sum_{i=1}^{R} x_i p_i \quad (8)$$

where $x_i = 1$ if the $i^{th}$ retrieved image is relevant, 0 otherwise, $p_i$ is the precision score after the $i^{th}$ image and R is the total number of relevant images.

One example of experimental setup is as follows. For a given (attribute, object) pair, the evaluation includes considering all the relevant images $N_R$ for the query and randomly sample $k*N_R$ irrelevant images from the dataset, where k is a hyperparameter. As k increases, the task difficulty also increases as the ranking component/model is configured to differentiate between relevant and irrelevant images from a much larger pool. The evaluation includes experimenting with various integer values of k and present the results for both Google® Bigrams and Flickr-30k datasets.

In addition to the ranking setup for image retrieval, one embodiment includes using customized ranking models (i.e., the first, second, and third network models) for the task of image classification. Given an image, the task is to identify the (attribute, object) pair that is represented in the image. While classifying any image, the ranking models consider all the pairs in the dataset and assign relevance scores to each pair. The ranking models extend the classification task to object only and attribute only classification tasks.

To evaluate the performance of the ranking models for the classification task, the Top-k accuracy metric is used. An image is classified correctly if the class for the image appears in the top-k predictions made by the model. The aggregated accuracy measure is an average of the scores for all images that the model classifies. Mathematically, it is formulated as follows:

$$\text{Top\_k Accuracy} = \frac{1}{N} \cdot \sum_{i=1}^{R} x_i \quad (9)$$

where $x_i = 1$ if the $i^{th}$ image is classified correctly, else 0 and N is the total number of images. The ranking models present the classification results over all images in the dataset for both Google® Bigrams and Flickr-30k.

Results for ground truth color profiles of text queries are recorded. In these experiments, the color profile of text queries is defined as the average color encoding of all the images relevant for the query. The retrieval results for k=5 and Top-20 classification accuracies are recorded. Plots show the variation in the retrieval metrics for different values of k.

The metric values demonstrate that incorporating color of both modalities outperforms the use of color in just images or no explicit modeling of color. An 8.24% increase is observed in the AUC for Google® Bigrams dataset. Furthermore, the plots show that the model performs consistently well for all values of k. These results illustrate that using color information for text queries increases performance of text-driven image retrieval.

Results for predicted color profiles of text queries are recorded. The use of colors predicted by the text-to-color models is evaluated. Evaluation results show that color features increase the performance of image retrieval models as even the less performing text-to-color models outperform the models that do not make use of color features. The results also show the color representation network is able to predict appropriate color profiles for (attribute, object) pairs for downstream applications.

To visualize the performance of the text-to-color models in a ranking setup, a real-time search engine is created. The search engine includes user feeding in a text query as an (attribute, object) pair and backend fetching relevant images. The search engine is configured to test with both models (i.e., baseline ranking component/the first network model, and the third network model) at the backend and show the ranked results for two exemplar queries. The first images belong to the query class, while the second images are irrelevant for that query.

For example, consider the query "warm sunshine", the third network model (i.e., the ranking component illustrated in FIG. 16) is able to retrieve images which are more yellowish, while the first network model (which does not use color features, see FIG. 15) fetches several pictures of a blue sky. Similarly, for the query "deep sea", the third network model captures the intuition that "deep" makes the blue of water, darker. On the other hand, the first network model retrieves several images of open water bodies as well. IR metrics show that adding color increases performance in image retrieval, for example.

Figure 17:
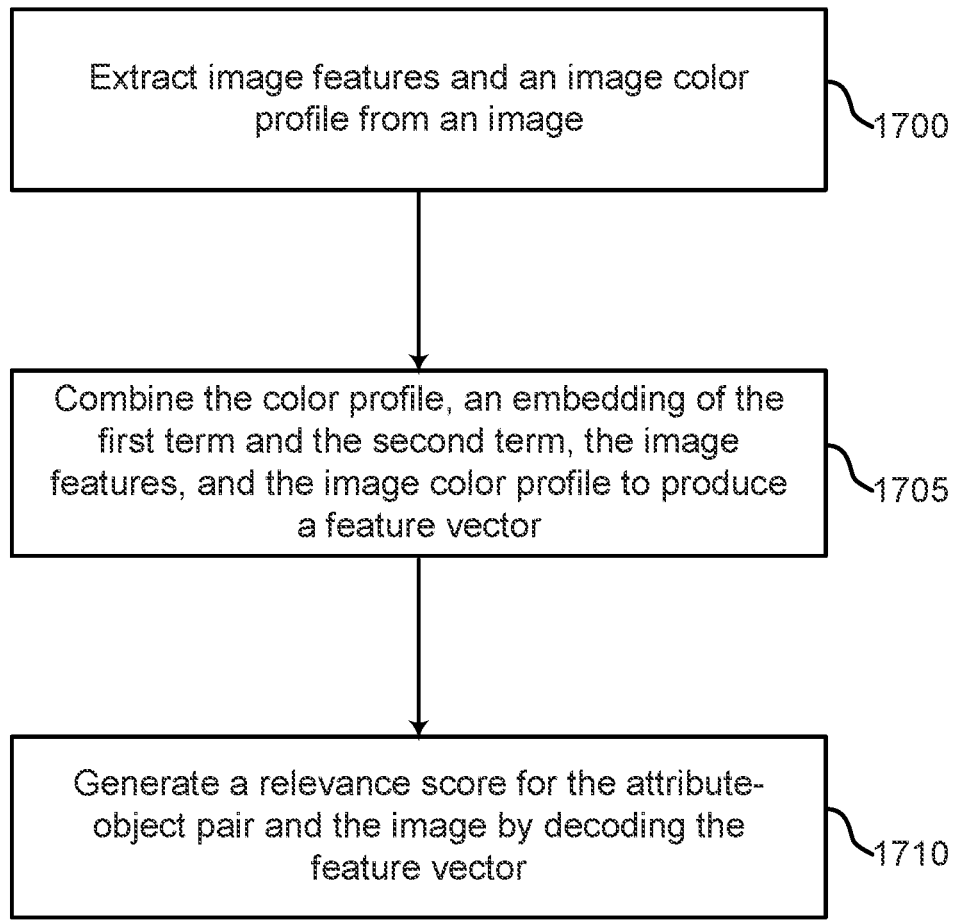
FIG. 17 shows an example of a process for generating a relevance score using a ranking component according to aspects of the present disclosure.

FIG. 17 shows an example of a process for generating a relevance score using a ranking component according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1700, the system extracts image features and an image color profile from an image. According to an embodiment, an image feature extractor is used to extract image features from an image (i.e. input image). An image color profile component is used to extract an image color profile from the same image. In some cases, the operations of this step refer to, or may be performed by, a ranking component as described with reference to FIGS. 1 and 16.

At operation 1705, the system combines the color profile, an embedding of the first term and the second term, the image features, and the image color profile to produce a feature vector. In some cases, the first term is also referred to as an attribute. The second term is also referred to as an object. The attribute and the object form an attribute-object pair. According to an embodiment, a color representation network is used to generate query color profile based on the attribute and the object. In addition, a word embedding component is used to generate attribute embedding and object embedding corresponding to the attribute and the object, respectively. Then, the query color profile, attribute embedding, object embedding, image features, and image color profile are input to a combined feature encoding layer, which outputs the feature vector. In some cases, the operations of this step refer to, or may be performed by, a ranking component as described with reference to FIGS. 1 and 16.

At operation 1710, the system generates a relevance score for the attribute-object pair and the image by decoding the feature vector. According to an embodiment, the feature vector is input to a scoring component, which is configured to generate a relevance score. In some cases, the operations of this step refer to, or may be performed by, a ranking component as described with reference to FIGS. 1 and 16.

EXAMPLE EMBODIMENTS

Accordingly, the present disclosure includes at least the following embodiments.

According to an embodiment, a dataset curation workflow is provided to build on top of standard captioning datasets or a search interface. In both cases, starting from a seed set of example attribute words, a representative dataset is constructed which covers an extended set of attributes and associated objects. Embodiments of the present disclosure can be applied in color and other attribute classes of interest (i.e., not limited to color).

According to an embodiment, image-modality network models extract less noisy color profile information from the image, through focusing on important regions of the image. A color classifier including an attention layer is configured to compute pixel-wise attention, with the corresponding values used to obtain a weighted color profile. Models trained on this data are shown to outperform those that were trained on the original data.

Conventional models relate to the classification domain, i.e., given an image, these models associate the image with a correct class. The "class" can be at individual attribute or object level, or for the pair. The ranking component of the present disclosure is configured to perform the converse ranking task, i.e., given a (attribute, object) pair as a query, the ranking component ranks order all of the images in terms of relevance.

A method for color representation is described. Embodiments of the method are configured to receive an attribute-object pair including a first term comprising an attribute label and a second term comprising an object label, encode the attribute-object pair to produce encoded features using a neural network that orders the first term and the second term based on the attribute label and the object label, and generate a color profile for the attribute-object pair based on the encoded features, wherein the color profile is based on a compositional relationship between the first term and the second term.

An apparatus for color representation is described. The apparatus includes a processor, memory in electronic communication with the processor, and instructions stored in the memory. The instructions are operable to cause the processor to receive an attribute-object pair including a first term comprising an attribute label and a second term comprising an object label, encode the attribute-object pair to produce encoded features using a neural network that orders the first term and the second term based on the attribute label and the object label, and generate a color profile for the attribute-object pair based on the encoded features, wherein the color profile is based on a compositional relationship between the first term and the second term.

A non-transitory computer readable medium storing code for color representation is described. In some examples, the code comprises instructions executable by a processor to: receive an attribute-object pair including a first term comprising an attribute label and a second term comprising an object label, encode the attribute-object pair to produce encoded features using a neural network that orders the first term and the second term based on the attribute label and the object label, and generate a color profile for the attribute-object pair based on the encoded features, wherein the color profile is based on a compositional relationship between the first term and the second term.

Some examples of the method, apparatus, and non-transitory computer readable medium described above further include embedding the first term and the second term using a word embedding model to produce an attribute embedding and an object embedding. Some examples of the method, apparatus, and non-transitory computer readable medium described above further include encoding the attribute embedding and the object embedding separately to produce attribute features and object features. Some examples further include concatenating the attribute features and the object features using an attribute-object ordering.

Some examples of the method, apparatus, and non-transitory computer readable medium described above further include encoding the attribute embedding and the object embedding together using a long short-term memory (LSTM) model. Some examples of the method, apparatus, and non-transitory computer readable medium described above further include decoding the encoded features using the neural network, wherein the color profile is an output of the decoding.

Some examples of the method, apparatus, and non-transitory computer readable medium described above further include extracting image features and an image color profile from an image. Some examples further include combining the color profile, an embedding of the first term and the second term, the image features, and the image color profile to produce a feature vector. Some examples further include generating a relevance score for the attribute-object pair and the image by decoding the feature vector.

In some examples, the color profile comprises a human-interpretable color profile. Some examples of the method, apparatus, and non-transitory computer readable medium described above further include searching for images based on the color profile.

An apparatus for learning color representation comprising a neural network is described. Embodiments of the apparatus include an encoder configured to encode an attribute-object pair to produce encoded features based on an ordering of a first term comprising an attribute label and a second term comprising an object label and a decoder configured to generate a color profile for the attribute-object pair based on the encoded features, wherein the color profile is based on a compositional relationship between the first term and the second term.

A method of providing an apparatus for learning color representation comprising a neural network is described. The method includes an encoder configured to encode an attribute-object pair to produce encoded features based on an ordering of a first term comprising an attribute label and a second term comprising an object label and a decoder configured to generate a color profile for the attribute-object pair based on the encoded features, wherein the color profile is based on a compositional relationship between the first term and the second term.

In some examples, the encoder comprises a word embedding model, an attribute encoding layer, an object encoding layer, and a combined feature encoding layer. In some examples, the encoder comprises a word embedding model and an LSTM layer. In some examples, the decoder comprises a plurality of fully connected layers.

Some examples of the apparatus and method described above further include a color classifier comprising a plurality of convolution layers, one or more attention layers, and a classification layer, wherein the color classifier is configured to identify an image color profile for images in an image set by attending to relevant portions of each image, and wherein attribute-object pairs associated with the image set are used together with the image color profile for training the neural network.

Some examples of the apparatus and method described above further include a ranking component comprising an image feature extractor, an image color profile component, a word embedding model, and a scoring component, wherein the ranking component is configured to generate a relevance score for the attribute-object pair and an image.

A method of training a neural network for color representation is described. Embodiments of the method are configured to identify a training set including attribute-object pairs and a ground truth color profile for each of the attribute-object pairs, predict a color profile for each of the attribute-object pairs using a neural network that orders a first term and a second term of the attribute-object pairs based on an attribute label and an object label, compare the predicted color profile for each of the attribute-object pairs to the corresponding ground truth color profile using a multi-task loss function, and update parameters of the neural network based on the comparison.

An apparatus of training a neural network for color representation is described. The apparatus includes a processor, memory in electronic communication with the processor, and instructions stored in the memory. The instructions are operable to cause the processor to identify a training set including attribute-object pairs and a ground truth color profile for each of the attribute-object pairs, predict a color profile for each of the attribute-object pairs using a neural network that orders a first term and a second term of the attribute-object pairs based on an attribute label and an object label, compare the predicted color profile for each of the attribute-object pairs to the corresponding ground truth color profile using a multi-task loss function, and update parameters of the neural network based on the comparison.

A non-transitory computer readable medium storing code of training a neural network for color representation is described. In some examples, the code comprises instructions executable by a processor to: identify a training set including attribute-object pairs and a ground truth color profile for each of the attribute-object pairs, predict a color profile for each of the attribute-object pairs using a neural network that orders a first term and a second term of the attribute-object pairs based on an attribute label and an object label, compare the predicted color profile for each of the attribute-object pairs to the corresponding ground truth color profile using a multi-task loss function, and update parameters of the neural network based on the comparison.

Some examples of the method, apparatus, and non-transitory computer readable medium described above further include identifying an initial set of images corresponding to an initial set of attribute-object pairs, wherein each of the images is associated with one of the attribute-object pairs. Some examples further include selecting an initial subset of attributes. Some examples further include selecting an initial subset of objects from the attribute-object pairs that include one of the initial subset of attributes. Some examples further include selecting an additional subset of attributes from the attribute-object pairs that include one of the initial subset of objects. Some examples further include generating the training set by selecting a subset of the set of images associated with an attribute-object pair that includes one of the initial subset of attributes or the additional subset of attributes.

Some examples of the method, apparatus, and non-transitory computer readable medium described above further include identifying a set of n-grams. Some examples further include filtering the set of n-grams to produce a set of bigrams. Some examples further include filtering the set of bigrams based on linguistic type to produce the attribute-object pairs. Some examples further include selecting a plurality of images by searching for images associated with the attribute-object pairs.

Some examples of the method, apparatus, and non-transitory computer readable medium described above further include identifying a caption for each of the images. Some examples further include performing part-of-speech tagging on the caption for each of the images to produce the attribute-object pairs.

Some examples of the method, apparatus, and non-transitory computer readable medium described above further include identifying a threshold constraint of unique attributes per object or unique objects per attribute. Some examples further include filtering the training set by removing unsuitable attribute-object pairs that do not meet the threshold constraint.

Some examples of the method, apparatus, and non-transitory computer readable medium described above further include identifying an image associated with each of the attribute-object pairs. Some examples further include generating the ground truth color profile based on the image using a color classifier comprising a plurality of convolution layers, one or more attention layers, and a classification layer.

In some examples, the multi-task loss function comprises a first term corresponding to an L2 task, a second term corresponding to a triplet loss task, and a third term corresponding to a quintuplet loss task.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for color representation, comprising:
receiving an attribute-object pair including a first term comprising an attribute label and a second term comprising an object label;
encoding the attribute-object pair to produce encoded features using a neural network by generating attribute features and object features separately and combining the attribute features and the object features based on a predetermined ordering; and
generating a color profile for the attribute-object pair based on the encoded features, wherein the color profile is based on a compositional relationship between the first term and the second term.

2. The method of claim 1, further comprising:
embedding the first term and the second term using a word embedding model to produce an attribute embedding and an object embedding.

3. The method of claim 2, further comprising:
encoding the attribute embedding and the object embedding separately to produce the attribute features and the object features; and
concatenating the attribute features and the object features using an attribute-object ordering.

4. The method of claim 2, further comprising:
encoding the attribute embedding and the object embedding together using a long short-term memory (LSTM) model.

5. The method of claim 1, further comprising:
decoding the encoded features using the neural network, wherein the color profile is an output of the decoding.

6. The method of claim 1, further comprising:
extracting image features and an image color profile from an image;
combining the color profile, an embedding of the first term and the second term, the image features, and the image color profile to produce a feature vector; and
generating a relevance score for the attribute-object pair and the image by decoding the feature vector.

7. The method of claim 1, wherein:
the color profile comprises a human-interpretable color profile.

8. The method of claim 1, further comprising:
searching for images based on the color profile.

9. An apparatus for learning color representation comprising a neural network, the neural network comprising:
an encoder configured to encode an attribute-object pair to produce encoded features by generating attribute features and object features separately and combining the attribute features and the object features based on a predetermined ordering of a first term comprising an attribute label and a second term comprising an object label; and
a decoder configured to generate a color profile for the attribute-object pair based on the encoded features, wherein the color profile is based on a compositional relationship between the first term and the second term.

10. The apparatus of claim 9, wherein:
the encoder comprises a word embedding model, an attribute encoding layer, an object encoding layer, and a combined feature encoding layer.

11. The apparatus of claim 9, wherein:
the encoder comprises a word embedding model and a long short-term memory (LSTM) layer.

12. The apparatus of claim 9, further comprising:
a color classifier comprising a plurality of convolution layers, one or more attention layers, and a classification layer, wherein the color classifier is configured to identify an image color profile for images in an image set by attending to relevant portions of each image, and wherein attribute-object pairs associated with the image set are used together with the image color profile for training the neural network.

13. The apparatus of claim 9, further comprising:
a ranking component comprising an image feature extractor, an image color profile component, a word embedding model, and a scoring component, wherein the ranking component is configured to generate a relevance score for the attribute-object pair and an image.

14. A non-transitory computer readable medium storing code for color representation, the code comprising instructions executable by at least one processor to:
receive an attribute-object pair including a first term comprising an attribute label and a second term comprising an object label;
encode the attribute-object pair to produce encoded features using a neural network that orders the first term and the second term based on the attribute label and the object label by generating attribute features and object features separately and combining the attribute features and the object features based on a predetermined ordering; and
generate a color profile for the attribute-object pair based on the encoded features, wherein the color profile is based on a compositional relationship between the first term and the second term.

15. The non-transitory computer readable medium of claim 14, the code further comprising instructions executable by the at least one processor to:
embed the first term and the second term using a word embedding model to produce an attribute embedding and an object embedding.

16. The non-transitory computer readable medium of claim 15, the code further comprising instructions executable by the at least one processor to:
encode the attribute embedding and the object embedding separately to produce the attribute features and the object features; and
concatenate the attribute features and the object features using an attribute-object ordering.

17. The non-transitory computer readable medium of claim 15, the code further comprising instructions executable by the at least one processor to:
encode the attribute embedding and the object embedding together using a long short-term memory (LSTM) model.

18. The non-transitory computer readable medium of claim 14, the code further comprising instructions executable by the at least one processor to:
decode the encoded features using the neural network, wherein the color profile is an output of the decoding.

19. The non-transitory computer readable medium of claim 14, the code further comprising instructions executable by the at least one processor to:
extract image features and an image color profile from an image;
combine the color profile, an embedding of the first term and the second term, the image features, and the image color profile to produce a feature vector; and
generate a relevance score for the attribute-object pair and the image by decoding the feature vector.

20. The non-transitory computer readable medium of claim 14, wherein:
the color profile comprises a human-interpretable color profile.

* * * * *